(12) United States Patent
Kumagai et al.

(10) Patent No.: US 10,821,577 B2
(45) Date of Patent: Nov. 3, 2020

(54) POWER TOOL

(71) Applicant: MAKITA CORPORATION, Anjo (JP)

(72) Inventors: Ryunosuke Kumagai, Anjo (JP); Akira Tomonaga, Anjo (JP); Kazuya Arakawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 171 days.

(21) Appl. No.: 15/880,728

(22) Filed: Jan. 26, 2018

(65) Prior Publication Data
US 2018/0222022 A1 Aug. 9, 2018

(30) Foreign Application Priority Data
Feb. 9, 2017 (JP) ................................. 2017-022415

(51) Int. Cl.
*B25F 5/00* (2006.01)
*B25B 21/02* (2006.01)
*B25F 5/02* (2006.01)
*B25D 11/10* (2006.01)
(Continued)

(52) U.S. Cl.
CPC .............. *B25B 21/02* (2013.01); *B25D 11/04* (2013.01); *B25D 11/104* (2013.01); *B25F 5/001* (2013.01); *B25F 5/02* (2013.01); *B25F 5/021* (2013.01); *B25D 2250/095* (2013.01);
(Continued)

(58) Field of Classification Search
CPC .. B25B 21/02; B25F 5/021; B25F 5/00; B25F 5/02
See application file for complete search history.

(56) References Cited

U.S. PATENT DOCUMENTS 6,206,538 B1 * 3/2001 Lemoine ................. B25B 23/18
307/132 R
6,518,719 B1 2/2003 Suzuki et al.
(Continued)

FOREIGN PATENT DOCUMENTS

CN 101293343 10/2008 ............. B25B 23/18
CN 101293343 A 10/2008
(Continued)

OTHER PUBLICATIONS

Office Action from the Chinese Patent Office dated Jun. 1, 2020 in related Chinese application No. 201810113247.2, and machine translation thereof.
(Continued)

*Primary Examiner* — Andrew M Tecco
(74) *Attorney, Agent, or Firm* — J-Tek Law PLLC; Jeffrey D. Tekanic; Scott T. Wakeman

(57) ABSTRACT

A power tool includes a motor disposed in a motor housing, a handle extending downward from the motor housing, a main switch provided on the handle and configured to switch the motor ON and OFF, and a state-changing operation part located on a lower portion of the motor housing or on an upper-end portion of the handle. The state-changing operation part is located upward of the main switch and is configured to effect a change of a rotational state of the motor, other than a direction of rotation of the motor, or an illumination level of a light.

20 Claims, 28 Drawing Sheets

(51) Int. Cl.
*B25D 11/04* (2006.01)
*F16H 3/54* (2006.01)
(52) U.S. Cl.
CPC .. *B25D 2250/121* (2013.01); *B25D 2250/265* (2013.01); *F16H 3/54* (2013.01); *F16H 2200/2005* (2013.01)

(56) References Cited

U.S. PATENT DOCUMENTS

| | | | |
|---|---|---|---|
| 6,536,536 | B1 * | 3/2003 | Gass ................ B23B 31/123 173/171 |
| 8,981,680 | B2 * | 3/2015 | Suda ................ B25F 5/021 315/314 |
| 9,712,091 | B2 * | 7/2017 | Sawano ................ H02P 6/22 |
| 2003/0196824 | A1 * | 10/2003 | Gass ................ B23B 31/123 173/131 |
| 2004/0174699 | A1 | 9/2004 | Minalga |
| 2005/0157489 | A1 * | 7/2005 | Oomori ................ B25B 23/18 362/119 |
| 2007/0159812 | A1 | 7/2007 | Oomori et al. |
| 2009/0128062 | A1 | 5/2009 | Watanabe et al. |
| 2009/0309519 | A1 * | 12/2009 | Suzuki ................ B25F 5/021 315/314 |
| 2011/0199756 | A1 | 8/2011 | Oomori et al. |
| 2012/0033405 | A1 | 2/2012 | Oomori et al. |
| 2013/0076271 | A1 | 3/2013 | Suda et al. |
| 2013/0193891 | A1 | 8/2013 | Wood et al. |
| 2014/0182869 | A1 * | 7/2014 | Kumagai ............ B25B 21/026 173/93 |
| 2017/0203418 | A1 | 7/2017 | Kumagai et al. |
| 2019/0143491 | A1 | 5/2019 | Kumagai et al. |

FOREIGN PATENT DOCUMENTS

| | | | |
|---|---|---|---|
| CN | 101434062 | 5/2009 | ............ B25F 5/00 |
| CN | 101434062 A | 5/2009 | |
| CN | 103009350 | 4/2013 | ............ B25F 5/00 |
| CN | 103009350 A | 4/2013 | |
| CN | 103223655 | 7/2013 | ............ B25B 21/00 |
| CN | 103223655 A | 7/2013 | |
| CN | 103894650 | 7/2014 | ............ B23B 45/16 |
| CN | 103894650 A | 7/2014 | |
| JP | S62120986 A | 6/1987 | |
| JP | 2001138266 A | 5/2001 | |
| JP | 2003211374 A | 7/2003 | |
| JP | 3100119 U | 4/2004 | |
| JP | 2014167926 A | 9/2014 | |
| JP | 5627738 B2 | 11/2014 | |

OTHER PUBLICATIONS

Search Report from the Chinese Patent Office dated May 21, 2020 in related Chinese application No. 201810113247.2, and machine translation thereof.

Office Action from the Japanese Patent Office dated Sep. 2, 2020 in counterpart Japanese application No. 2017-022415, and machine translation thereof.

Machine translation of Search Report from the Japanese Patent Office dated Aug. 24, 2020 in counterpart Japanese application No. 2017-022415, including machine translation of examined claims 1-6.

* cited by examiner

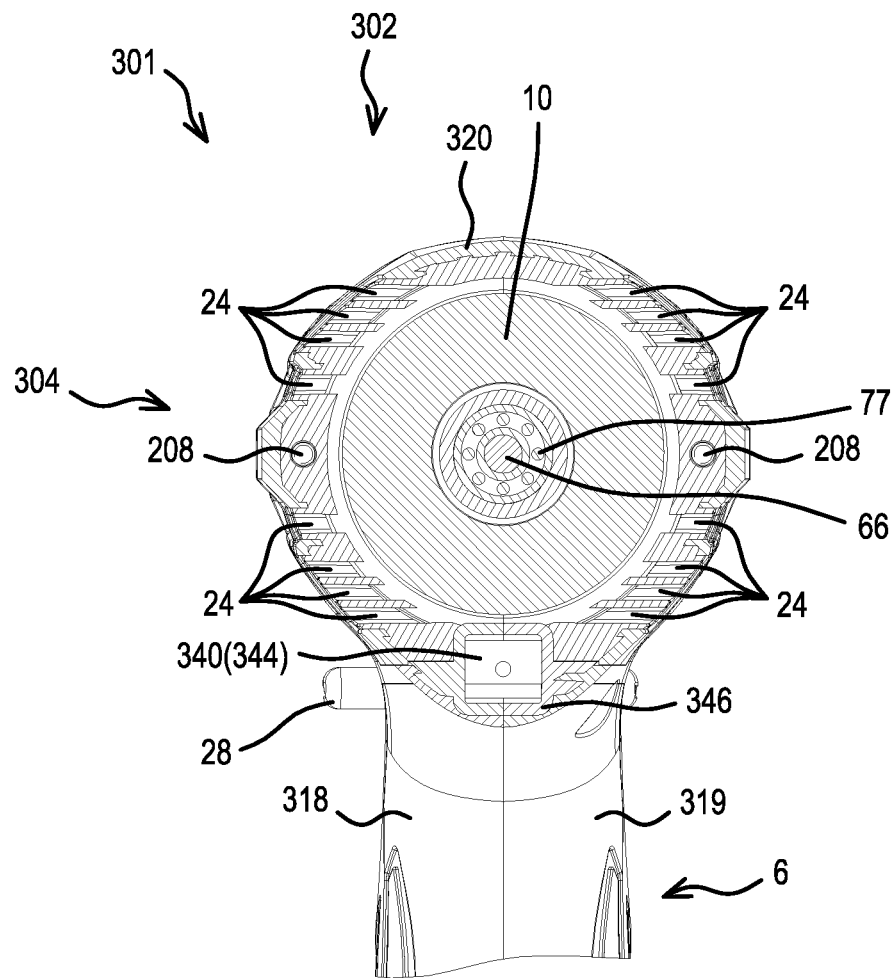
FIG.22
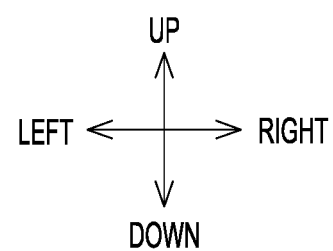

POWER TOOL

CROSS-REFERENCE

The present application claims priority to Japanese patent application serial number 2017-022415 filed on Feb. 9, 2017, the contents of which are incorporated fully herein by reference.

TECHNICAL FIELD

The present invention relates to a power tool such as an impact driver.

BACKGROUND ART

Japanese Patent No. 5627738 discloses an impact driver having a switch panel, which is capable of performing a switching operation to change an operating mode of the power tool and is provided on a lower-end side of a handle part (grip).

SUMMARY

However, because the switch panel of Japanese Patent No. 5627738 is provided on the lower-end side of the handle part, to operate the switch panel reliably, the user must operate the switch panel with one hand while supporting the impact driver with the other hand; therefore, the modes of operation and ease of operation are limited.

A principal object of the present teachings is to provide a power tool having an improved ease of operation, i.e. to provide a more ergonomical power tool.

In a first aspect of the present teachings, a power tool comprises: a motor; a main-body part (motor housing), in which the motor is disposed; a handle part, which extends downward from the main-body part; a main switch, which is provided on the handle part and switches the motor ON and OFF; and a state-changing operation part (state-changing manipulation part), which is located on a lower part of the main-body part or an upper-end part of the handle part, is provided upward of the main switch, and changes a rotational state, other than the rotational direction, of the motor.

In a second aspect of the present teachings, a power tool comprises: a motor; a main-body part (motor housing), in which the motor is disposed; a handle part, which extends downward from the main-body part; a main switch, which is provided on the handle part and switches the motor ON and OFF; a light, which radiates light; and a state-changing operation part (state-changing manipulation part), which is located on a lower part of the main-body part or an upper-end part of the handle part, is provided upward of the main switch, and changes the lamp ON/OFF state of the light.

In a third aspect of the present teachings, the state-changing operation part is disposed forward of the main switch.

In a fourth aspect of the present teachings, a power tool comprises: a motor; a main-body part (motor housing), in which the motor is disposed; a handle part, which extends downward from the main-body part; a main switch, which is provided on the handle part and switches the motor ON and OFF; and a state-switching switch, which is located on a front-end part or a rear-end part of the main-body part or is located on a front-end part or a rear-end part of an upper-end part of the handle part, is provided upward of the main switch, and switches a rotational state of the motor.

In a fifth aspect of the present teachings, a power tool comprises: a motor; a main-body part (motor housing), in which the motor is disposed; a handle part, which extends downward from the main-body part; a main switch, which is provided on the handle part and switches the motor ON and OFF; a light, which radiates light; and a state-switching switch, which is located on a front-end part or a rear-end part of the main-body part or is located on a front-end part or a rear-end part of an upper-end part of the handle part, is provided upward of the main switch, and switches the lamp ON/OFF state of the light.

In a sixth aspect of the present teachings, the state-switching switch is provided on a (the) lower part of the main-body part.

A principal effect of the present teachings is that a power tool having an improved ease of operation is provided.

BRIEF DESCRIPTION OF THE DRAWINGS

FIG. 22 is a cross-sectional view taken along line C-C in FIG. 19.

DETAILED DESCRIPTION OF THE EMBODIMENTS

Representative embodiments and modified examples thereof of the present teachings are explained below, referencing the drawings where appropriate.

Front, rear, up, down, left, and right in these embodiments and modified examples are defined for the sake of convenience of explanation and may change based on, for example, the work situation, the state of a member that moves, or the like.

It is noted that the present invention is not limited to the embodiments and modified examples described below.

First Embodiment

Figure 1:
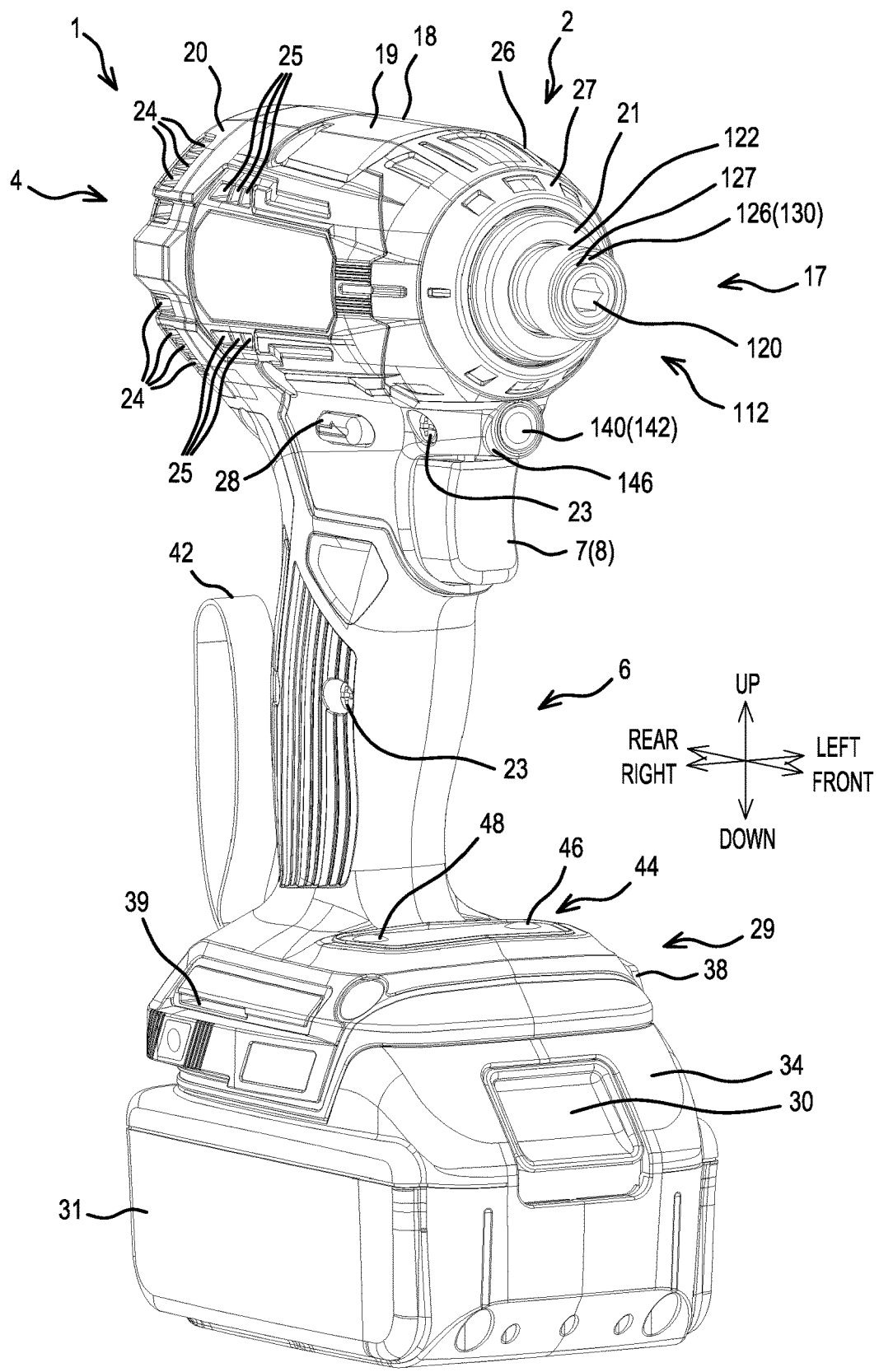
FIG. 1 is an oblique view, viewed from the front, of an impact driver according to a first embodiment of the present teachings.
Figure 2:
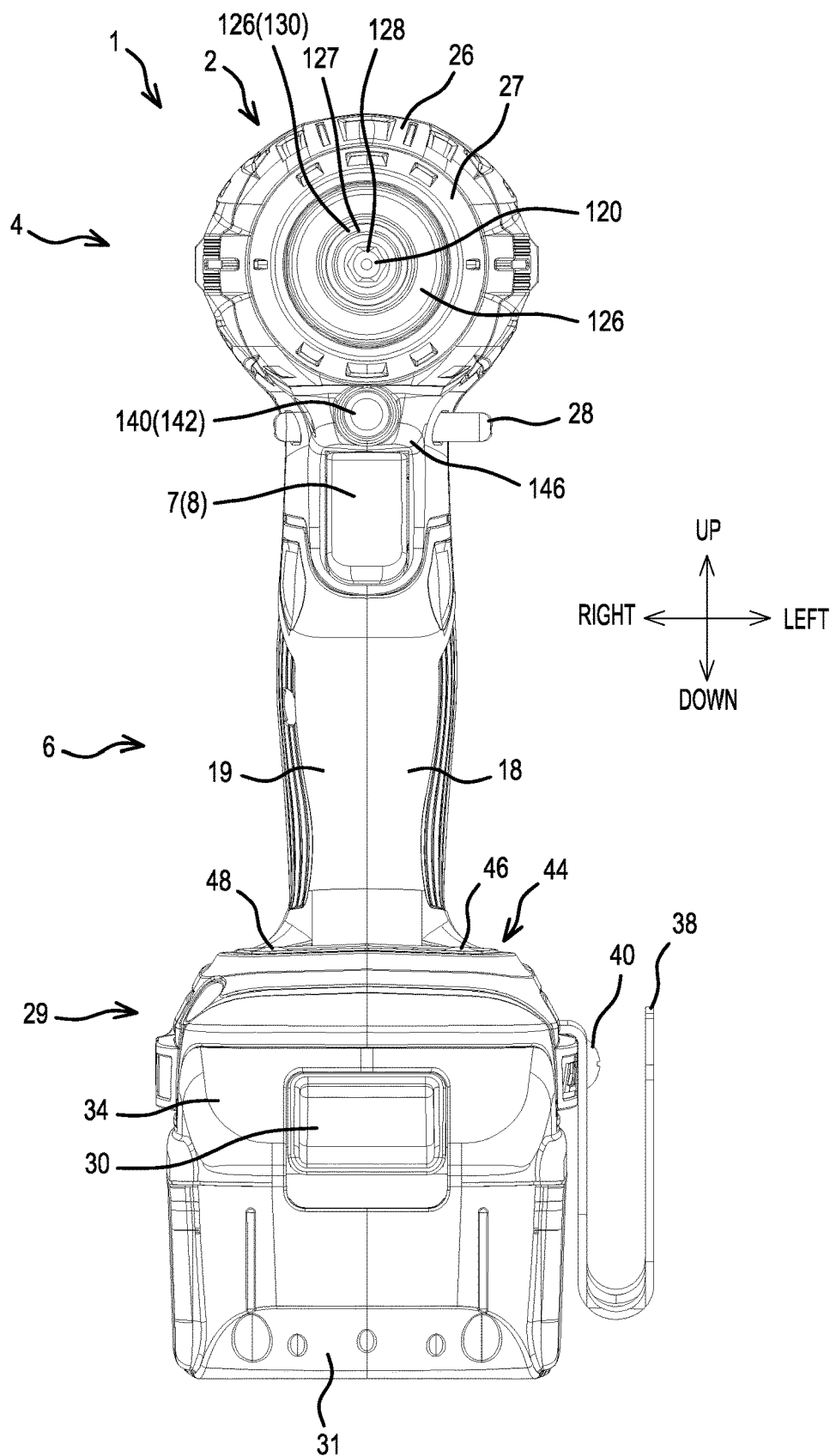
FIG. 2 is a front view of the impact driver shown in FIG. 1.
Figure 3:
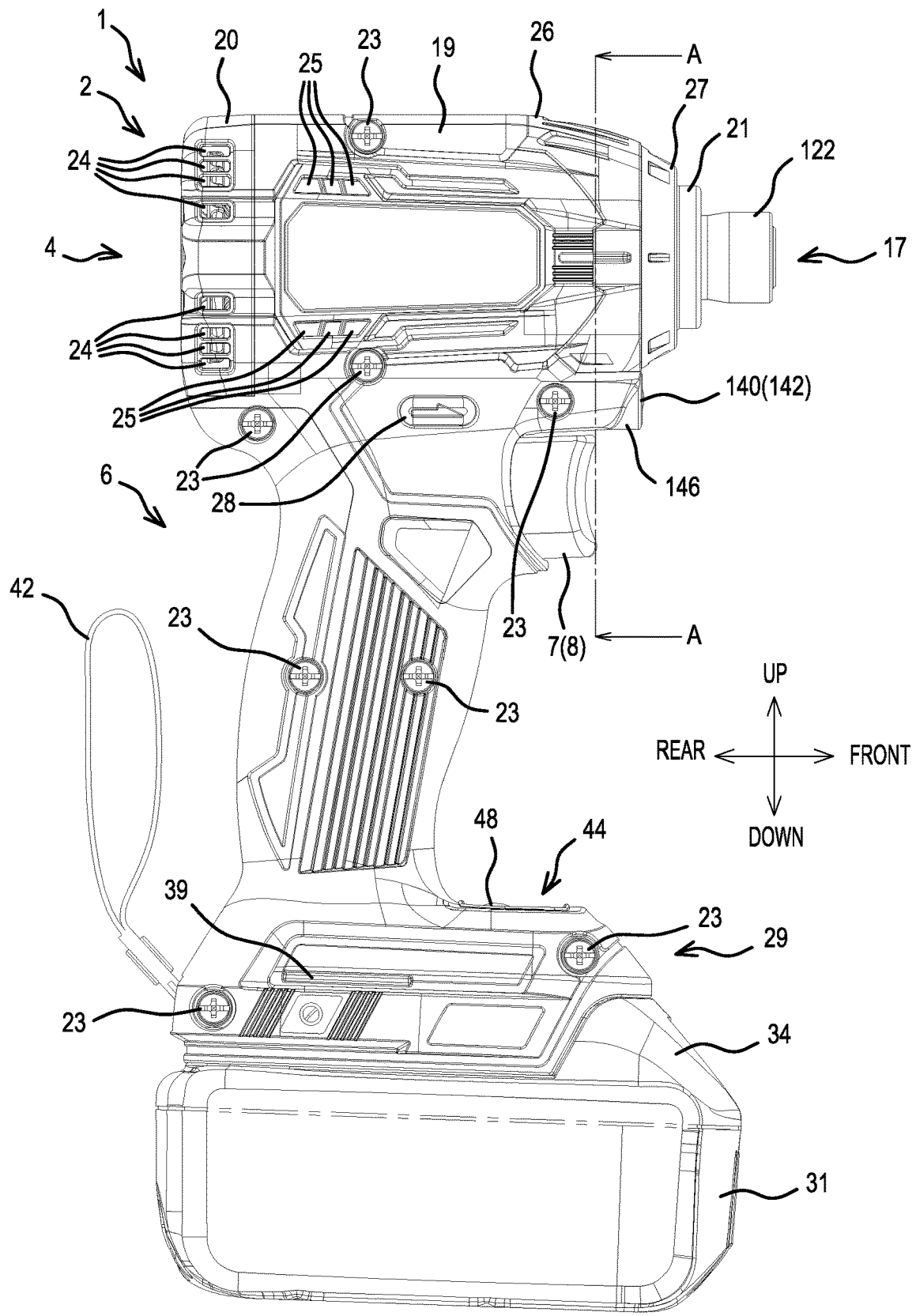
FIG. 3 is a right view of the impact driver shown in FIG. 1.
Figure 4:
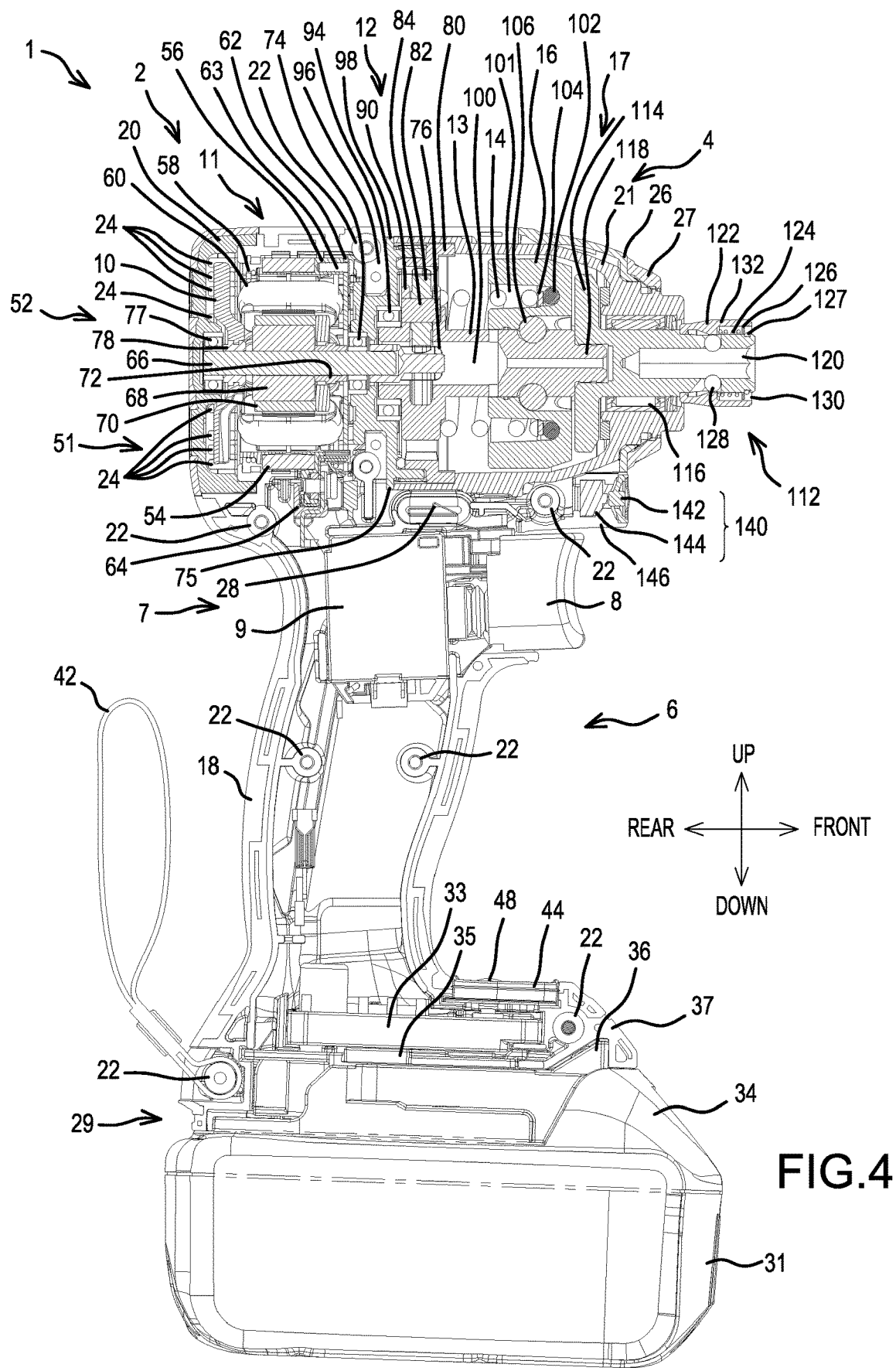
FIG. 4 is a center longitudinal-cross-sectional view of the impact driver shown in FIG 1.
Figure 5:
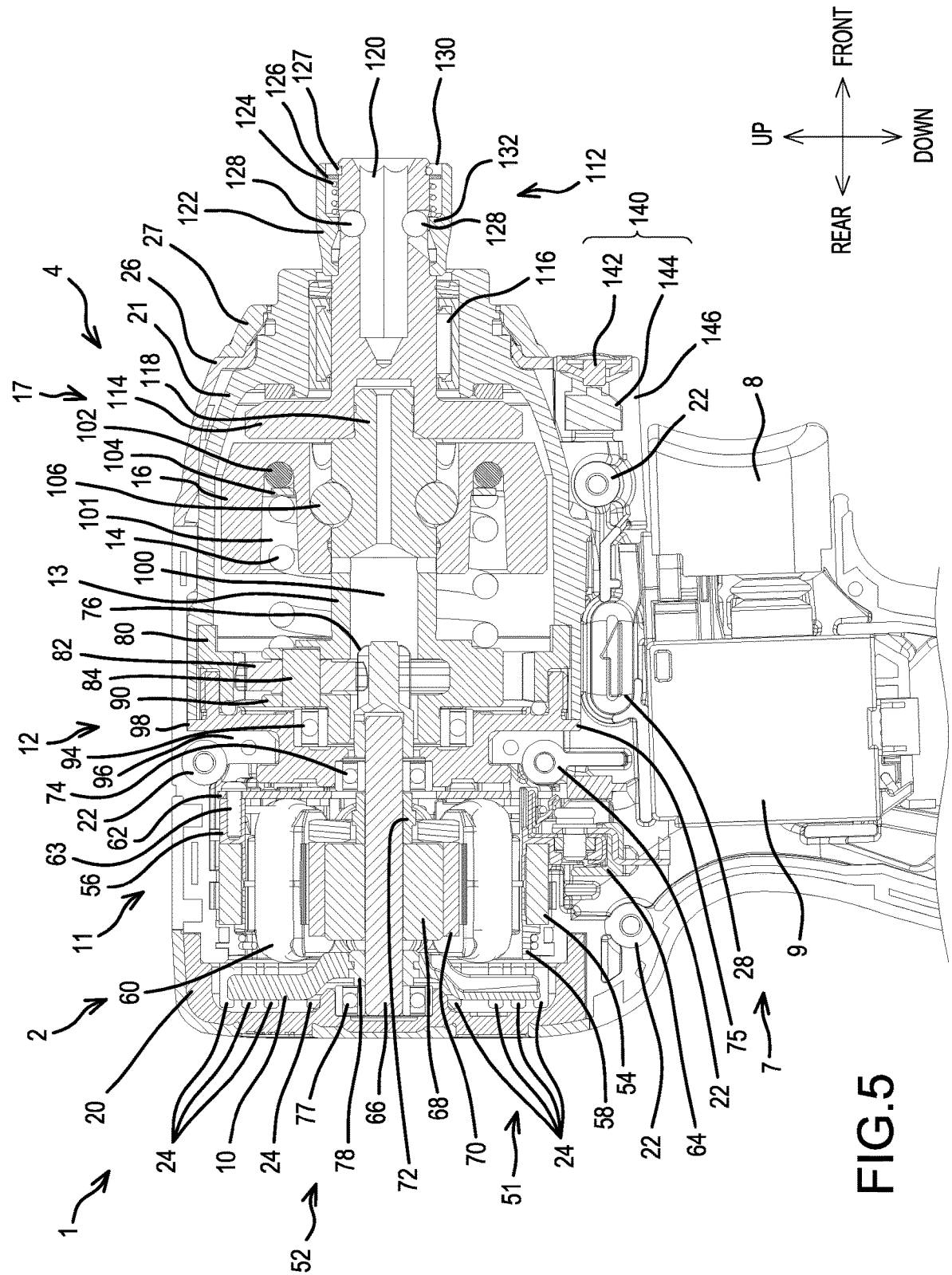
FIG. 5 is an enlarged view of an upper part of the impact driver shown in FIG. 4.
Figure 6:
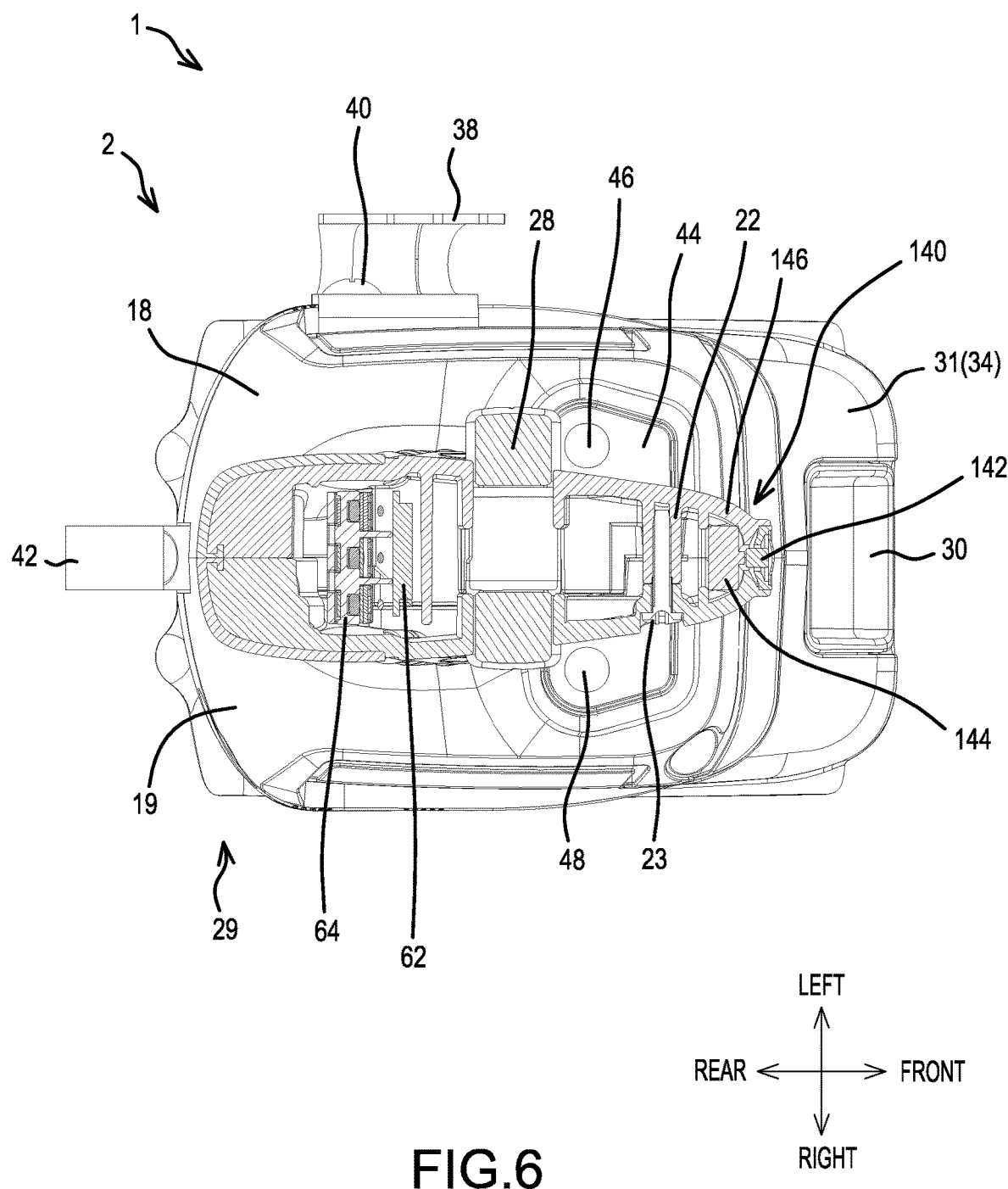
FIG. 6 is a transverse cross-sectional view of a portion between a main-body part and a trigger shown in FIG. 1.
Figure 7:
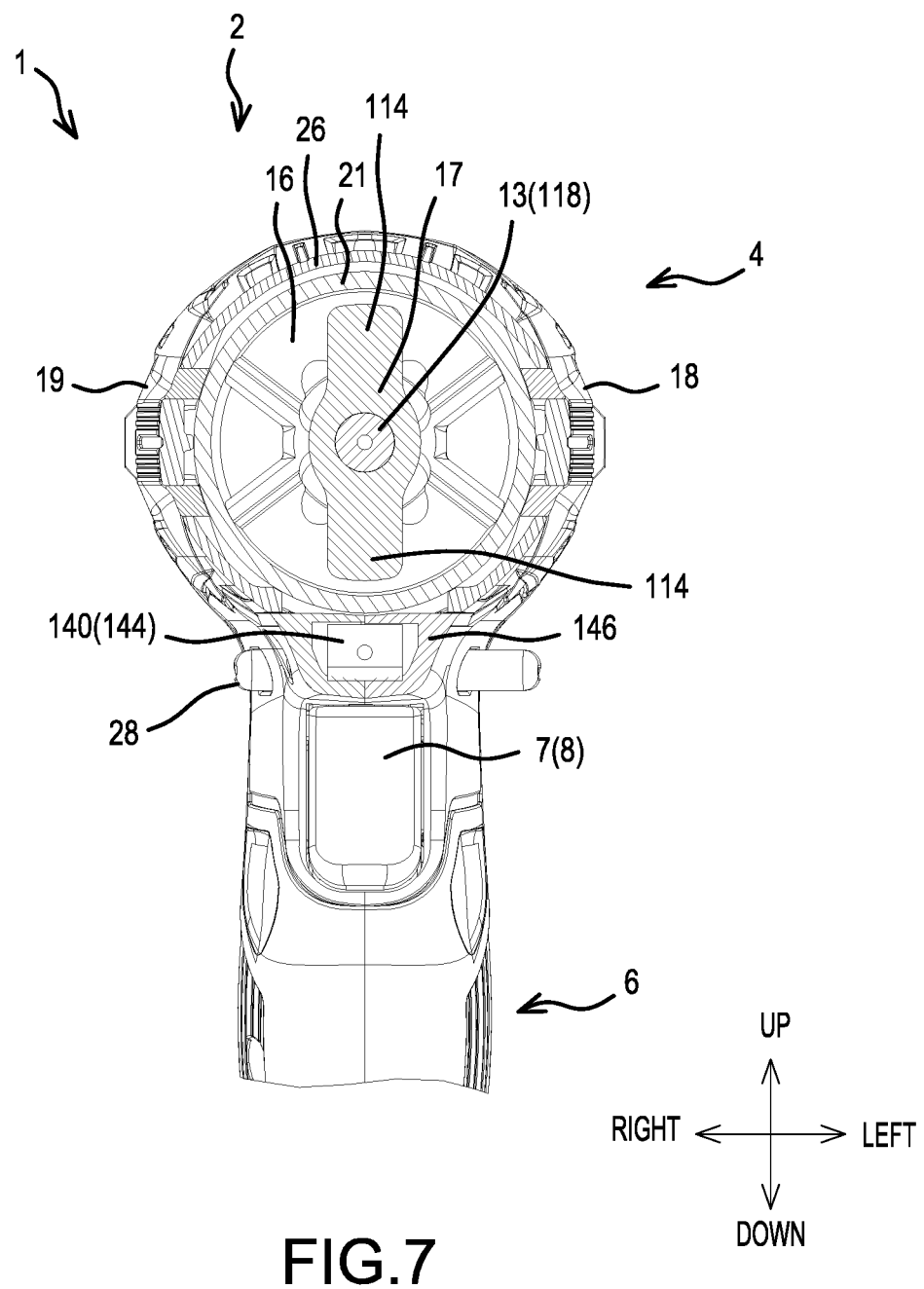
FIG. 7 is a cross-sectional view taken along line A-A in FIG. 3.

FIG. 1 is an oblique view, viewed from the front, of an impact driver 1 according to a first embodiment of the present teachings, which is one example of a rotary-impact tool that is one representative, non-limiting example of a power tool according to the present teachings; FIG. 2 is a front view of the impact driver 1; FIG. 3 is a right view of the impact driver 1; FIG. 4 is a center longitudinal-cross-sectional view of the impact driver 1 (note that a battery is not shown in cross section); FIG. 5 is an enlarged view of an upper part of FIG. 4; FIG. 6 is a transverse cross-sectional view of a portion between a main-body part and a trigger of the impact driver 1; and FIG. 7 is a cross-sectional view taken along line A-A in FIG. 3.

The impact driver 1 comprises a housing 2, which forms the outer wall of the impact driver 1.

The impact driver 1 comprises a circular-column shaped main-body part 4, whose central axis is set to the front-rear direction, and a handle part 6, which is formed such that it protrudes downward from a lower part of the main-body part 4. It is noted that, in FIGS. 3, 4, the right is the front.

The handle part 6 is a portion that is grasped by the user, and a main switch 7 is disposed on an upper-end part of the handle part 6. The main switch 7 comprises a trigger 8, which is capable of an operation (manipulation) in which the user pulls the main switch 7 with his or her fingertip, and a main-switch main-body part 9, which switches the main switch 7 ON and OFF based on the operation of the trigger 8. The trigger 8 protrudes from the main-switch main-body part 9 and is visible on the housing 2 (an upper-front part of the handle part 6). The main-switch main-body part 9 is disposed inside the housing 2.

In order from the rear side, a fan 10, a motor 11, a planetary-gear mechanism 12 that is a speed-reducing mechanism, a spindle 13, a coil spring 14 that is an elastic member, a hammer 16, and an anvil 17 are coaxially inserted (disposed) in the main-body part 4 of the impact driver 1. It is noted that the arrangement of the various members in and/or one the various housings, cases, and the like shall include, as appropriate, an arrangement (embodiment) in which the members (components) are completely contained in the housings, the cases, and the like, and an arrangement (embodiment) in which some of the members are contained in the housings, the cases, and the like, and the remaining members protrude or are visible from the housings, the cases, and the like.

The motor 11 is the drive source of the impact driver 1; the rotation of the motor 11 is transmitted to the spindle 13. Furthermore, the rotational force of the spindle 13 is converted, if appropriate, into a rotational impact force (at least one of a rotational force and an impact force) by the hammer 16, etc. (an impact-mechanism part), and, while being cushioned as appropriate by the spring 14 that extends between the spindle 13 and the hammer 16, is transmitted to the anvil 17, which serves as an output shaft. The anvil 17 is a member that receives the rotational impact force and is capable of rotating about an axis; the anvil 17 receives a bit (tool accessory), which is not shown. A driver can be used as the bit, and the impact driver 1 can be used for tightening screws.

The housing 2 comprises a left motor housing 18 and a right motor housing 19, which are each half-housing shaped and together define a motor housing, a rear cover 20, and a tube-shaped hammer case 21. The left motor housing 18 comprises a plurality of screw-boss parts 22, 22, . . . , and the right motor housing 19 has screw holes corresponding to the screw-boss parts 22, 22, . . . . The left motor housing 18 and the right motor housing 19 are joined together by screws 23, 23, . . . , which enter the screw holes and the screw-boss parts 22, 22, . . . .

The left motor housing 18 and the right motor housing 19 extend from a rear part (excluding a rear-end part) of the main-body part 4 to the handle part 6. A portion of the left motor housing 18 and the right motor housing 19 that is adjacent the rear-end part of the main-body part 4 is an opening.

Air-exhaust ports 24, 24, . . . , which are arranged in the up-down direction, are provided on both sides of a rear part of the rear cover 20 (an outer-wall portion of the main-body part 4); and air-suction ports 25, 25, . . . , which are arranged in the front-rear direction, are provided forward of the air-exhaust ports 24, 24, . . . above and below (an outer-wall portion of the main-body part 4) on both sides of the rear parts of the left motor housing 18 and the right motor housing 19.

The rear cover 20 widens in the up-down direction and the left-right direction and is secured by screws (not shown) in the state in which the rear cover 20 covers the opening in the left motor housing 18 and the right motor housing 19 (i.e., is disposed on the rear-end part of the main-body part 4).

The hammer case 21 is a bell-shaped member, wherein the diameter of a front part is smaller than that of a rear part, and forms an outer wall of a front part of the main-body part 4. A rear part of the hammer case 21 is contained in the opening formed in front-end parts of the left motor housing 18 and the right motor housing 19 of the main-body part 4.

A tube-shaped cover 26 is disposed on an outer side of a center part of the hammer case 21 in the front-rear direction, and a ring-shaped bumper 27, which is formed of an elastic body, is disposed on an outer side of the front-end part of the hammer case 21.

Between the main-body part 4 and the handle part 6 and rearward of the trigger 8, a forward/reverse switching lever 28, which is a switch that switches the rotational direction of the motor 11, is provided such that it passes through the housing 2 in the left-right direction.

A lower-end part of the handle part 6 constitutes a battery-mounting part 29, which widens outward with respect to the upper part of the handle part 6, and a battery 31, which is capable of being mounted and dismounted (removed) by using (pushing) a battery button (lever) 30, is held (supported) downward of the battery-mounting part 29. The battery 31 is, e.g., a 14.4 V (volt) lithium-ion battery, and eight cells, which are not shown, are contained inside a battery case, which is made of resin. Each cell has a circular-column (cylindrical) shape that is elongated in an axial direction and is oriented in a left-right direction.

A controller 33, which comprises a circuit board, is contained in an inner part of the battery-mounting part 29. A switching device for varying the speed of the motor 11 is installed in the controller 33.

The battery 31 comprises a battery-terminal part on its upper surface and comprises a raised part 34 on its front-upper part. The battery 31 is mounted by being slid rearward from the front of the battery-mounting part 29. When being mounted, a rear part of the raised part 34 makes contact with a front part of the battery-mounting part 29, and the battery-terminal part contacts a terminal 35, which is incorporated in the battery-mounting part 29. The terminal 35 is electrically connected to the controller 33. In addition, during mounting, a battery tab 36, which is biased upward by the elastic member (not shown) and protrudes from the upper surface of another portion of the battery 31, enters a battery-mounting recessed part 37, which is hollowed upward and provided on a lower-front part of the battery-mounting part 29. On the other hand, when the battery 31 is dismounted (removed), the battery button (lever) 30, which is connected to the elastic member of the battery tab 36, is operated (pressed), and the battery 31 is slid forward while maintaining the state in which the battery tab 36 is separated from the battery-mounting recessed part 37.

Hook grooves 39, to which a hook 38 can attach, are provided on the left and right sides of the upper part of the battery-mounting part 29, which is the lower-end part of the housing 2. One of the hook grooves (not shown) is formed in the left motor housing 18, and the other hook groove 39 is formed in the right motor housing 19. The hook 38 is attached by a screw 40.

In addition, a strap 42 is attached to the rear part of the battery-mounting part 29, which is the lower-end part of the housing 2. A loop-shaped strap-attaching loop is formed on one end of the strap 42, and that strap-attaching loop is looped around the lower rear screw-boss part 22. The portion outside of the strap-attaching loop of the strap 42 is a strap loop that has an elongated loop shape.

Furthermore, an operation panel 44 is provided on a front-upper part of the battery-mounting part 29 (an upper-surface part on the front side of the widened lower part of the handle part 6), which is the lower-end part of the housing 2.

Figure 8:
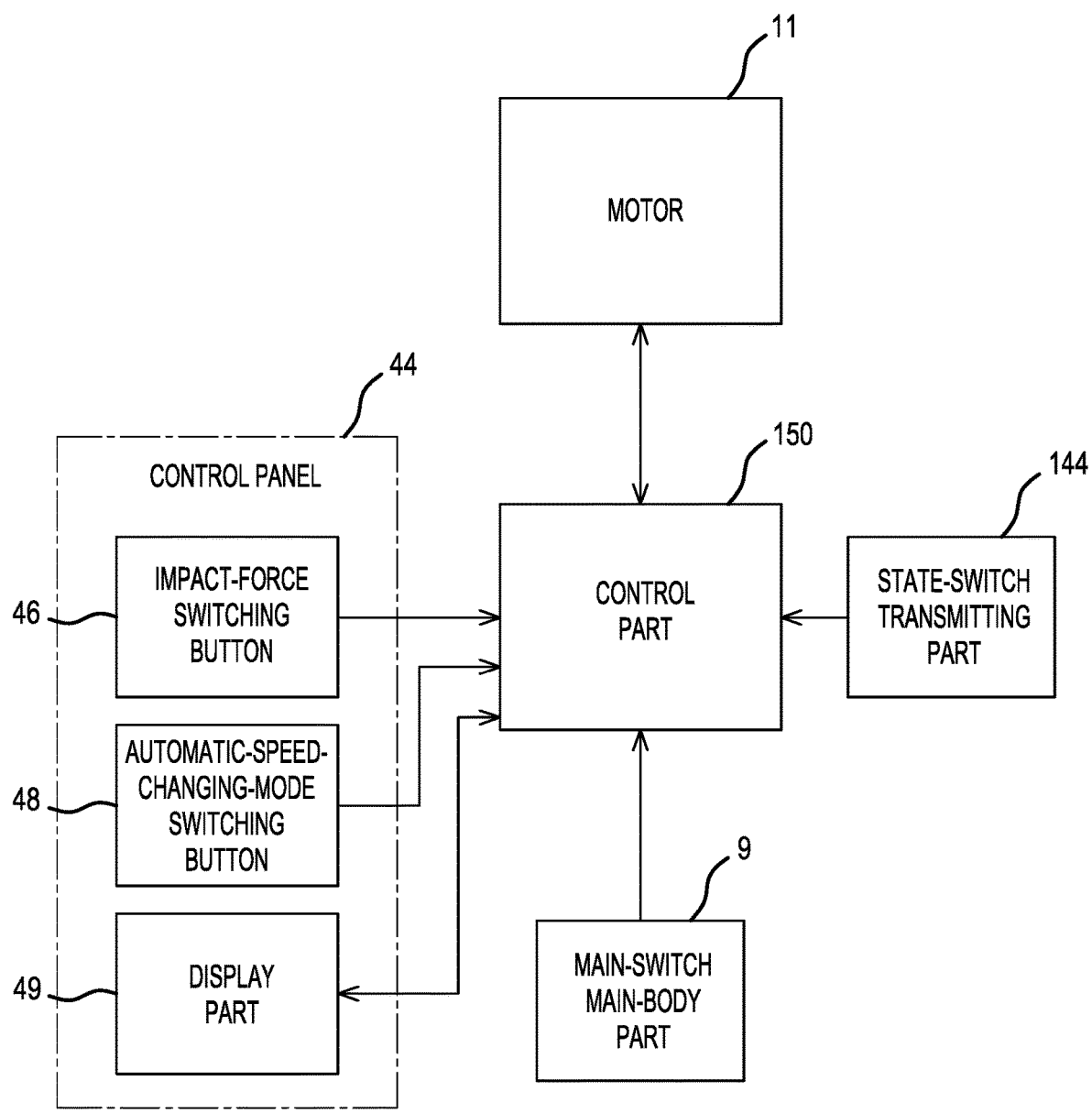
FIG. 8 is a block diagram of the principal parts of a controlling means according to the impact driver shown in FIG. 1.

The operation panel 44 comprises: an impact-force switching button 46, which is electrically connected to the controller 33 and switches the magnitude of the impact force imparted by the hammer 16; an automatic-speed-changing-mode switching button 48, which switches whether the automatic speed-changing mode is set, and a display part 49 (FIG. 8).

The display part 49 comprises an impact-force display portion, which displays the current impact force, a remaining-battery-charge display portion, which displays the remaining charge of the battery 31, an automatic-speed-changing-mode display portion, which displays whether the automatic speed-changing mode is set, and the like.

The motor 11 is a brushless motor (brushless DC motor) and is contained inside the motor housing composed of the left motor housing 18 and the right motor housing 19 (the rear part of the main-body part 4). The motor 11 comprises, inside the left motor housing 18 and the right motor housing 19: a circular-cylinder shaped stator 51, which is disposed inside a rib that extends inward; and a rotor 52 (inner rotor), which is disposed in the interior of the stator 51.

The stator 51 comprises: a circular-cylinder shaped stator core 54, the axial direction of which is in the front-rear direction and which comprises a plurality of (six) internal teeth that protrude inward; a front-insulating member 56 and a rear-insulating member 58, which are provided on the front and rear of the stator core 54; and a plurality of drive coils 60, 60, . . . , the drive coils 60 being wound around the internal teeth of the stator core 54 through (on) the front-insulating member 56 and the rear-insulating member 58. In addition, a sensor circuit board 62 is fixed to the front-insulating member 56 by screws 63, 63, . . . . Three magnetic sensors, which are not shown, are fixed to a front surface of the sensor circuit board 62. Furthermore, a total of six coil-connection parts, which are not shown and serve as contacts that electrically connect the sensor circuit board 62 with each of the drive coils 60, is provided on a circumferential edge of a front surface of the front-insulating member 56. The coil-connection parts are electrically connected to a terminal part 64, which protrudes downward; one end of each lead wire (not shown) is connected to the terminal part 64, and the other end is connected to the controller 33.

The rotor 52 comprises: a motor shaft 66, which serves as a rotary shaft (rotor shaft); a circular-cylinder shaped rotor core 68, which is disposed around the motor shaft 66; permanent magnets 70, 70, . . . , which are tubular, are disposed on the outer side of the rotor core 68, and whose polarities alternate in the circumferential directions; and a plurality of sensor permanent magnets, which is not shown and is radially disposed on the front side of the permanent magnets 70, 70, . . . (i.e., on the sensor circuit board 62 side of the stator 51). The rotor core 68, the permanent magnets 70, and the sensor permanent magnets constitute a rotor assembly. The permanent magnets 70, 70, . . . and the sensor permanent magnets in the rotor assembly can also be integrally configured as four plate-shaped permanent magnets.

A tubular resin sleeve 72 is provided on the front side of the rotor core 68 in the motor shaft 66. A motor front bearing 74, which is disposed around the front part of the motor shaft 66, is provided forward of the sleeve 72. The motor front bearing 74 is mounted inside an opening of a rear part of a bearing retainer 75. A pinion gear 76 is fixed, integrally with the motor shaft 66, to a tip part of the motor shaft 66, which is the front side of the motor front bearing 74. On the other hand, a rear-end part of the motor shaft 66 is rotatably supported by a motor rear bearing 77. The motor rear bearing 77 is held by an interior center part of the rear cover 20.

The fan 10 is disposed in the vicinity of the rear part of the motor shaft 66. The fan 10 is a centrifugal fan having a plurality of blades and is integrally fixed to the motor shaft 66 via a fan sleeve 78.

Air-exhaust ports 24, 24, . . . are located outward of the fan 10.

It is noted that the fan 10, a portion thereof, or the like can also be configured as a structural element of the motor 11.

The planetary-gear mechanism 12 comprises: a ring-shaped internal gear 80, which has internal teeth; a plurality of planet gears 82, 82, . . . , each planet gear having external teeth that mesh with the internal gear 80; and pins 84, which are the shafts of the planet gears 82.

The internal gear 80 is non-rotatably (fixedly or immovably) mounted inside the opening of the rear-end part of the hammer case 21.

Each of the planet gears 82 is disposed inward of the internal gear 80.

Each of the pins 84 has a circular-column shape, in which the axial direction is set in the front-rear direction.

The planet gears 82 are provided around the pins 84 in the state wherein each of the planet gears 82 is rotatable around its corresponding pin 84.

The spindle 13 comprises a hollow discoidal part 90 at the rear part thereof. The discoidal part 90 protrudes outward (vertically and laterally) with respect to the other portion of the spindle 13, and the diameter of the discoidal part 90 is larger than that of the other portion. A rear end of the spring 14, which is formed in a ring shape, contacts the front surface of the discoidal part 90. In addition, a spindle bearing 94, which is mounted in a center part of the bearing retainer 75, is disposed on the outer side of the rear-end part of the spindle 13 in the state in which the rear-end part protrudes in a circular-cylinder shape rearward from a rear surface of the discoidal part 90; the spindle 13 is rotatably supported.

The bearing retainer 75 has a circular-cylinder shaped inner surface of a rear part, a circular-cylinder shaped inner surface of a center part, the diameter of which is larger than that of the circular-cylinder shaped inner surface of the rear part, and a circular-cylinder shaped inner surface of the front part, the diameter of which is larger yet, and these inner surfaces are connected. A housing rib 96, which is formed in an inner part of the left motor housing 18 and the right motor housing 19, is contained between the center part and the rear part of the bearing retainer 75. In addition, the bearing retainer 75 comprises a retainer ring 98, which protrudes outward, between the center part and the front part; the retainer ring 98 is interposed between the rear-end part of the hammer case 21 and the front surface of the housing rib 96. Furthermore, the front part of the bearing retainer 75 is interposed between the inner side of the rear-end part of the hammer case 21 and an outer surface of the internal gear 80.

An inner diameter of the spindle bearing 94 is larger than an inner diameter of the motor front bearing 74, which is held by the bearing retainer 75. In addition, a rear surface of the spindle bearing 94 is disposed in a state wherein it is located forward of a front surface of the motor front bearing 74 and wherein the spindle bearing 94 and the motor front bearing 74 are shifted from one another in the front-rear directions. Thereby, the force transmitted from the spindle 13 to the spindle bearing 94 tends not to transmit to the motor front bearing 74, and therefore the motor front bearing 74, the motor 11, and the like have a long life.

An inner hole 100 is formed in an inner part of the spindle 13. The spindle 13, the front part of which is narrow and the rear part of which is wider than the front part, passes through the inner hole 100. The rear part of the inner hole 100 is connected to the hollow part of the discoidal part 90. The tip part of the motor shaft 66, the pinion gear 76, etc. are contained in the rear part of the inner hole 100; the pins 84, 84, . . . are fixed and the planet gears 82, 82, . . . are disposed in an inner part of the discoidal part 90; the pinion gear 76 and the planet gears 82, 82, . . . mesh.

The hammer 16 has a hollow 101, which is hollowed in a tubular manner forward from a rear surface of the hammer 16, a front part of the spring 14 is contained in the hollow 101, and a ring-shaped front end of the spring 14 is disposed, via a plurality of spring balls 102, 102, . . . and a hammer washer 104, at the bottom (i.e., a front end) of the hollow 101.

It should be noted that hammer balls 106, 106, which guide the hammer 16 principally in the front-rear direction during impact, are interposed between the hammer 16 and a front part of the spindle 13.

The anvil 17, which is on the front side of the hammer 16, comprises a chuck 112 on the circumference of the front part of the anvil 17.

The anvil 17 comprises a pair of extension parts 114, 114, which extends in a radial direction, on the rear part of the anvil 17.

An anvil bearing 116, which rotatably supports the anvil 17 around its axis, is provided on the front side of the extension parts 114, 114. The anvil bearing 116 is attached to an inner wall of a front-end part of the hammer case 21.

In addition, a rear hole, which is formed frontward, is provided in inner parts of the extension parts 114, 114, and is the center of the rear-end part of the anvil 17; a protruding part 118, which is formed in a front-end part of the spindle 13, is contained in that rear hole. The rotation of the spindle 13 is transmitted to the anvil 17 via the hammer 16, and thereby the elements from the hammer 16 and the spindle 13 to the planetary-gear mechanism 12 constitute a motive-power transmission mechanism that transmits motive power to the anvil 17. The power-transmission mechanism is contained inside the main-body part 4 (the hammer case 21). The principal motive-power transmission direction of the power-transmission mechanism is a rotational direction in which the front-rear direction serves as the axis.

An anvil hole 120, which leads rearward from the front end of the anvil 17, is formed in an interior of the anvil 17. The anvil hole 120 receives the bit, which is not shown.

The chuck 112 fixes the bit that has been received in the anvil hole 120.

The chuck 112 comprises a chuck sleeve 122, a chuck spring 124, a chuck washer 126, a chuck-spring stop 127, and a plurality of chuck balls 128, 128. The chuck sleeve 122 is a circular-cylinder shaped member and comprises: a chuck front hole 130, the inner diameter of which is larger than the outer diameter of the front part of the anvil 17 and which is formed extending from the front end to the center part; and a chuck-ball pressing part 132, the inner diameter of which is equal to the outer diameter of the front part of the anvil 17 and which protrudes inward with respect to the chuck front hole 130.

The chuck spring 124 is contained in the chuck front hole 130.

The chuck washer 126 is disposed on the front side of the chuck spring 124, which is inside the front-end part of the chuck front hole 130.

The chuck-spring stop 127 is a C-shaped member and is fixed to the outer surface of the tip part of the anvil 17 in the state in which the chuck-spring stop 127 is disposed on the front side of the chuck washer 126. With regard to the chuck-spring stop 127, the chuck spring 124 is housed inside the chuck front hole 130 via the chuck washer 126.

The chuck balls 128, 128 are disposed such that they are arranged along a line in the radial direction of the anvil hole 120, protrude from the interior of the anvil hole 120, and are capable of contacting the chuck-ball pressing part 132 of the chuck sleeve 122.

If the chuck sleeve 122 is pulled forward while receiving the elastic force of the chuck spring 124, the chuck-ball pressing part 132 separates from the chuck balls 128, the chuck balls 128 become capable of greatly moving to the outer side in the radial direction, the chuck balls 128 withdraw from the interior of the anvil hole 120 when the bit is inserted, the bit becomes capable or being inserted in the anvil hole 120, and the bit becomes capable of being mounted. Furthermore, in the state in which the rear part of the bit has been inserted, when the chuck sleeve 122 is returned rearward, the chuck-ball pressing part 132 contacts the chuck balls 128, the chuck balls 128 push inward, and the bit is pressed and thereby fixed to the anvil 17.

Furthermore, a state-changing operation part 140, which is (located on) the lower part (portion) of the main-body part 4 (on the lower side of the hammer case 21, the bumper 27, etc.), is provided on the upper side of the trigger 8 and forward of the forward/reverse switching lever 28.

The state-changing operation part 140 comprises: a state-switching button 142, which serves as a state-switching switch that is capable of being pressed by the user; and a state-switch transmitting part 144, in which a signal for switching among various states is transmitted based on the operation (manipulation, pressing) of the state-switching button 142.

The state-changing operation part 140 is contained in a state-changing-operation-part installation part 146, which is formed on the lower part of the front-end part of the main-body part 4 in the left motor housing 18 and the right motor housing 19 in the state in which the front part of the state-switching button 142 is visible.

In addition, the state-changing operation part 140 is disposed in a portion in which the left motor housing 18 and the right motor housing 19 overlap the hammer case 21 in the front-rear direction, and the state-switching button 142 is disposed on the outer side of the hammer case 21.

The state-changing operation part 140 (the state-switch transmitting part 144) is connected to the controller 33 by lead wires, which are not shown.

FIG. 8 shows the principal structural elements of a means of controlling the impact driver 1.

The controller 33 comprises a control part 150, which controls various elements.

The control part 150 is connected to the main-switch main-body part 9 and controls the motor 11. The main-switch main-body part 9 turns ON and OFF in accordance with the amount by which the trigger 8 is pulled in; for example, the main-switch main-body part 9 turns ON if the trigger 8 is pulled in by a first pull-in amount or greater and turns OFF if the trigger 8 is pulled in by less than the first pull-in amount. The control part 150 turns the motor 11 ON and OFF in accordance with the ON/OFF state of the main-switch main-body part 9.

In addition, the main-switch main-body part 9 transmits a signal in accordance with the pull-in amount from the first pull-in amount to a second pull-in amount at a further pulled-in position (e.g., a maximum pull-in position), and the control part 150 changes the rotational speed of the motor 11, in accordance with that signal (the pull-in amount of the trigger 8), by controlling the motor 11 such that the greater the pull-in amount, the higher the rotational speed. When the trigger 8 is maximally pulled to the second pull-in amount, the control part 150 drives the motor 11 such that it runs at maximum speed in accordance with the current impact-force setting. Accordingly, the main switch 7 can also be viewed as a rotational-speed-changing operation part that changes the rotational speed of the motor 11.

In addition, the control part 150 ascertains the switch states of the impact-force switching button 46, the automatic-speed-changing-mode switching button 48, etc. on the operation panel 44 and, in accordance with those switch states, controls the drive of the motor 11, indications on the display part 49, and the like.

With each pressing of the impact-force switching button 46, the control part 150 sequentially switches the impact-force setting in four stages (levels or steps): "Maximum Speed," "High," "Medium," and "Low." If the impact-force setting is "Maximum Speed," then the control part 150 sets the state in which the maximum speed during the drive of the motor 11 is the maximum among the four stages, and thereby the impact force imparted by the hammer 16 is the maximum among the four stages. In addition, if the impact-force setting is "High," "Medium," or "Low," then the control part 150 sets the state in which the maximum speed during the drive of the motor 11 is the second stage (level), the third stage (level), or the fourth stage (level), respectively, of the four stages (levels or steps), and thereby the impact force imparted by the hammer 16 is set to the second stage, the third stage, or the fourth stage, respectively, of the four stages. In addition, the control part 150 causes the display part 49 (the impact-force display part) to function. For example, if the impact-force setting is "Maximum Speed," "High," "Medium," or "Low," then the control part 150 turns ON four lamps, three lamps, two lamps, or one lamp, respectively, on the impact-force display part, which comprises four lamps (LEDs).

On the other hand, with each pressing of the automatic-speed-changing-mode switching button 48, the control part 150 alternately sets the automatic speed-changing mode or cancels that mode and sets a normal mode. If the mode is the automatic speed-changing mode, then, regardless of the current impact-force setting, the control part 150 automatically changes the speed of the motor 11 in accordance with a program that is input in advance. In addition, the control part 150 causes the display part 49 (the automatic-speed-changing-mode display part) to function. For example, on the automatic-speed-changing-mode display part, which comprises one lamp (LED), the control part 150 turns the lamp ON if the mode is the automatic speed-changing mode and turns the lamp OFF if the mode is the normal mode.

Furthermore, the control part 150 ascertains the operation state of the state-changing operation part 140 and controls the changing of the state in accordance with the various modes.

Figure 9:
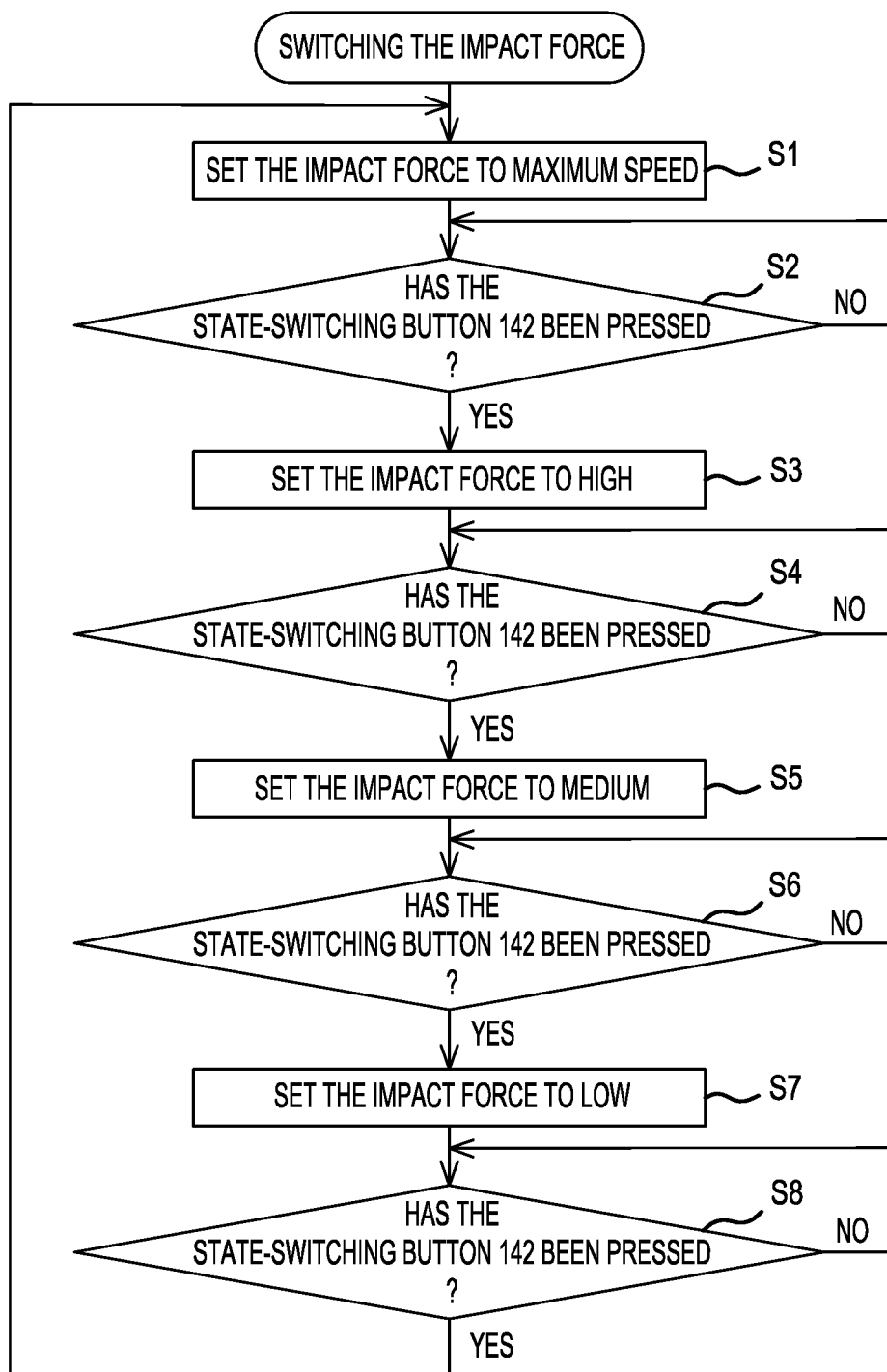
FIG. 9 is a flow chart related to the control of a state-changing operation part performed by the controlling means shown in FIG. 8.

As shown in FIG. 9, in the same manner as the control in accordance with the impact-force switching button 46, control related to the state-changing operation part 140 is performed by the control part 150 of the impact driver 1. It is noted that the process steps are abbreviated with "S" where appropriate.

That is, when the battery 31 is connected, the control part 150 sets the state in which the maximum speed during drive of the motor 11 is the maximum speed among the four stages and thereby sets the impact force imparted by the hammer 16 to "Maximum Speed," which is the maximum among the four stages (S1).

Then, if the state-switching button 142 is pressed and the state-switch transmitting part 144 is switched (YES in S2), the control part 150 sets the state in which the maximum speed during drive of the motor 11 is the second fastest among the four stages and thereby sets the impact force imparted by the hammer 16 to "High," which is the second stage from the highest stage among the four stages (S3).

If the state-switching button 142 is pressed again and the state-switch transmitting part 144 is switched again (YES in S4), then the control part 150 sets the state in which the maximum speed during drive of the motor 11 is the third fastest among the four stages and thereby sets the impact force imparted by the hammer 16 to "Medium," which is the second stage from the lowest stage among the four stages (S5).

If the state-switching button 142 is then pressed once again and the state-switch transmitting part 144 is switched once again (YES in S6), the control part 150 sets the state in which the maximum speed during drive of the motor 11 is the slowest among the four stages and thereby sets the impact force imparted by the hammer 16 to "Low," which is the first stage from the lowest stage among the four stages (S7).

Thereafter, the control part 150 awaits the pressing of the state-switching button 142 (S8) and, if pressed, then the impact force is once again set to "Maximum Speed" (returns to S1).

At the same time, the control part 150 displays the currently-selected impact force on the display part 49 (the impact-force display part), as described above.

An operational example of the impact driver 1 of this type will now be explained.

If the user grasps the handle part 6 and pulls the trigger 8, then the main-switch main-body part 9 switches, and thereby electric power is supplied from the battery 31 to the motor 11, which is driven at a speed in accordance with the pull-in amount of the trigger 8. Thereby, the trigger 8 is a switch-operation part that switches the motor 11 ON and OFF via the main-switch main-body part 9 and thereby turns the motor 11 ON and OFF; the trigger 8 and the main-switch main-body part 9 constitute the main switch 7 of the motor 11.

The switching devices of the controller 33 switch the drive coils in accordance with the rotational position of the rotor 52 ascertained by the magnetic sensors of the sensor circuit board 62, and thereby the rotor 52 (the motor shaft 66) rotates.

The fan 10 rotates owing to the rotation of the motor shaft 66 and exhausts air via the air-exhaust ports 24, 24, . . . , and thereby a flow of air from the air-suction ports 25, 25, . . . to the air-exhaust ports 24 is generated. In addition to the motor 11, the other internal mechanisms of the impact driver 1 are cooled by the flow of the air.

Furthermore, the speed of the motor shaft 66 is reduced by the planetary-gear mechanism 12 and the rotational force of the motor shaft 66 is transmitted to the spindle 13; further, the rotational force of the spindle 13 is transmitted to the anvil 17 via the hammer 16.

In addition, if a torque of a prescribed threshold or greater is received at the anvil 17, then the spindle 13 guides the hammer 16 such that the hammer 16 oscillates forward and rearward (such that the hammer 16 impacts). The elastic force of the spring 14 causes the hammer 16 to return to its original position after each impact.

Furthermore, the user can grasp the handle part 6 by a means other than the index finger and can press the state-changing operation part 140 on the trigger 8 with the index finger; thereby, with each pressing of the state-changing operation part 140, the control part 150 ascertains the switching of the state-switch transmitting part 144 and sequentially switches the impact-force setting.

The impact driver 1 described above comprises: the motor 11; the main-body part 4, in which the motor 11 is disposed; the handle part 6, which extends downward from the main-body part 4; the main switch 7, which is provided on the handle part 6 (the upper part) and switches the motor 11 ON and OFF; and the state-changing operation part 140, which is (located on) the front-end part of the lower part of the main-body part 4, is provided upward of the main switch 7 and changes a rotational state (impact force) of the motor 11. Thereby, in addition to operating the state-changing operation part 140 with one hand while gripping the impact driver 1 with the one hand, the user can operate the state-changing operation part 140 with the index finger of that one hand while gripping the handle part 6 by a means other than the index finger of the one hand; further, in the impact driver 1, it becomes possible to switch the impact force by operating the state-changing operation part 140 with one hand alone, and therefore ease of operation is much more satisfactory.

In addition, the state-changing operation part 140 is disposed forward of the main switch 7. Thereby, operation of the state-switching button 142 is performed with a forward finger, such as the index finger, while the handle part 6 is held with one hand, and therefore operation is much easier to perform.

In addition, the impact driver 1 comprises: the motor 11; the main-body part 4, in which the motor 11 is disposed; the handle part 6, which extends downward from the main-body part 4; the main switch 7, which is provided on the upper part of the handle part 6 and switches the motor 11 ON and OFF; and the state-switching button 142, which is (located on) the front-end part of the main-body part 4, is provided upward of the main switch 7 and switches a rotational state (the impact force) of the motor 11. Thereby, in the impact driver 1, it becomes possible to switch the impact force by operating the state-switching button 142 on the front-end part with one hand alone, and therefore ease of operation is much more satisfactory.

Furthermore, the state-switching button 142 of the impact driver 1 is provided on the lower part of the main-body part 4. Thereby, the state-switching button 142 is disposed at a location adjacent the handle part 6, and thus the operation of the state-switching button 142 while holding the handle part 6 with one hand is much easier.

It is noted that the embodiments of the present teachings are not limited to the above-mentioned first embodiment; for example, the first embodiment includes, where appropriate, the following modified examples.

The main switch, the trigger, etc. may be disposed at a location other than the upper-end part, which is the upper part, of the handle part, and the state-changing operation part may be provided on the upper-end part of the handle part. Even in such an embodiment, the state-changing operation part can be made easy to operate with one hand while maintaining ease of operation of the main switch.

The number of stages (levels or steps) of the impact force can be increased or decreased. The switching of the impact force may be such that it becomes stronger in order from "Low." The switching of the impact force and the switching of the automatic speed-changing mode may be merged; for example, switching may be performed in order from "Maximum Speed," "High," "Medium," "Low," and automatic speed-changing mode.

At least one of the various display parts on the operation panel may be omitted, other types of display parts may be added, the locations of the display parts, the buttons, and the like may be changed to locations other than the operation panel, and so on. The automatic speed-changing mode and the switching button thereof may be omitted. Modes other than the automatic speed-changing mode may be provided.

The operation panel, the impact-force switching button, or the like may be omitted, and the impact force may be changed by the state-changing operation part alone.

The state-changing operation part may be a state-switching switch, such as a state-switching button or a state-switching lever, that switches the stage of the impact force or may be a state-changing dial or the like that changes the impact force without stages (steps), i.e. continuously. In addition, the state-changing operation part may be a touch panel that switches the stage of the impact force or changes the impact force without stages or continuously.

Instead of switching (level changing) based upon the pressing of a button switch, the various switches, including the state-switching button, and the transmitting part (the switch main-body part) thereof can be of some other type, such as a toggle switch operated by a lever, a rocker switch, a DIP switch, a switch that switches based on a contact sensor, and the like. Switches of types other than one in which a trigger is pulled may be used as the main switch. The main switch may be a switch that switches the motor only ON and OFF without changing the rotational speed of the motor. The switches, dials, etc. and the transmitting part (the switch main-body part) may be integrated. The signal in accordance with the switches, the dials, etc. may be the resistance value of a variable resistor, or the like.

A motor-control part that controls the motor and a switch-control part that controls the switches may be implemented separately by hardware.

In the planetary-gear mechanism, instead of inserting the pins in the carrier or in addition thereto, the pins may be inserted into holes of projections or tabs may be latched to one another. In addition, the holes into which the pins are inserted may be holes having a bottom, i.e. a blind hole.

The planetary-gear mechanism may be modified to some other speed-reducing mechanism or may be omitted.

The motor may be an outer-rotor type in which the rotor is disposed on the outer side of the stator. In addition, the motor may be a motor other than a brushless motor. The six switching devices may be disposed on the sensor circuit board instead of the controller. In addition, the number of the switching devices, the drive coils, the sensor permanent magnets, the magnetic sensors, etc. can be increased or decreased where appropriate. The sensor circuit board can also be screwed to the rear-insulating member in the state in which the sensor circuit board is disposed rearward of the rear-insulating member.

One or two or more intermediate shafts may be interposed between the motor shaft and the anvil.

The battery may be any lithium-ion battery of 10.8 V, 18 V (max. 20 V), 18 V, 25.2 V, 28 V, 36 V, etc. or of a voltage that is less than 10.8 V or greater than 36 V; in addition, other types of batteries may be used.

The number of sections of the housing, the number of planet gears installed, the number of stages of the speed-increasing mechanism, the number of the air-suction/air-exhaust ports, and the like can be increased or decreased, and the number, placement, material, size, and type of the various members and portions can be modified where appropriate.

The present teachings can also be adapted to a rechargeable driver drill or a vibration-driver drill by utilizing a gear case, omitting the hammer and the anvil, further disposing a speed-reducing-mechanism part such as, for example, a two-stage planetary-gear mechanism, making the output shaft of the speed-reducing-mechanism part protrude forward from the gear case, and fixing the tool-accessory holding part (tool holder or chuck), which holds the tool accessory, to the front part of the output shaft.

In addition, the present teachings can also be adapted to a rechargeable angle power tool, wherein the direction of the output shaft (the tool-accessory retaining part) differs (by substantially 90°) from the axial direction (the direction of the motor shaft of the motor, the transmission direction of the mechanism that transmits that rotational force, and the like).

Furthermore, the present teachings can also be adapted to: other rechargeable power tools, such as an impact wrench, a screwdriver, a hammer drill, a reciprocating saw, or the like; a power tool connected to a commercial power supply; a gardening tool, such as a cleaner, a blower, or a gardening trimmer; and the like.

Second Embodiment

Figure 10:
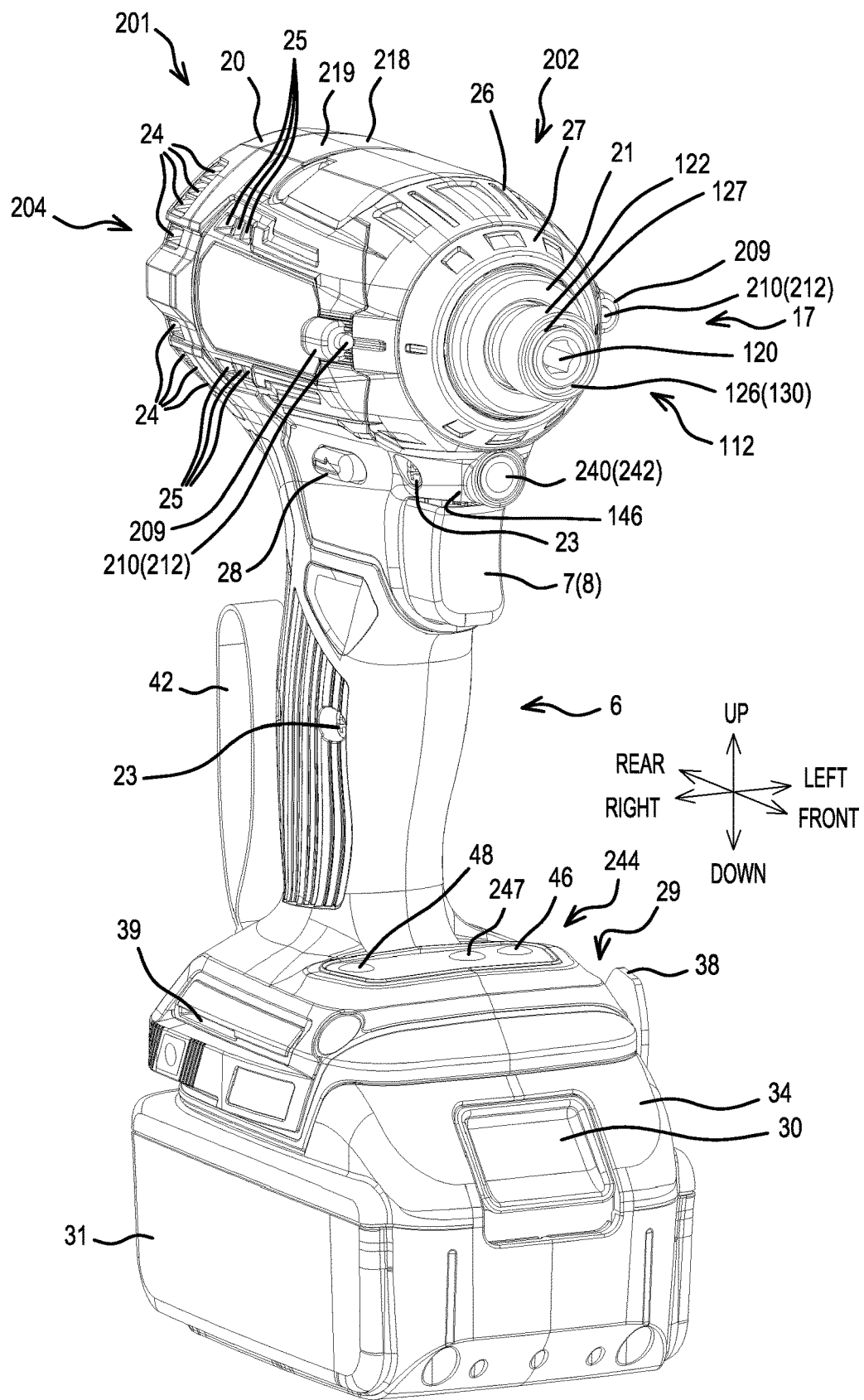
FIG. 10 is a drawing, corresponding to FIG. 1, of an impact driver according to a second embodiment of the present teachings.
Figure 11:
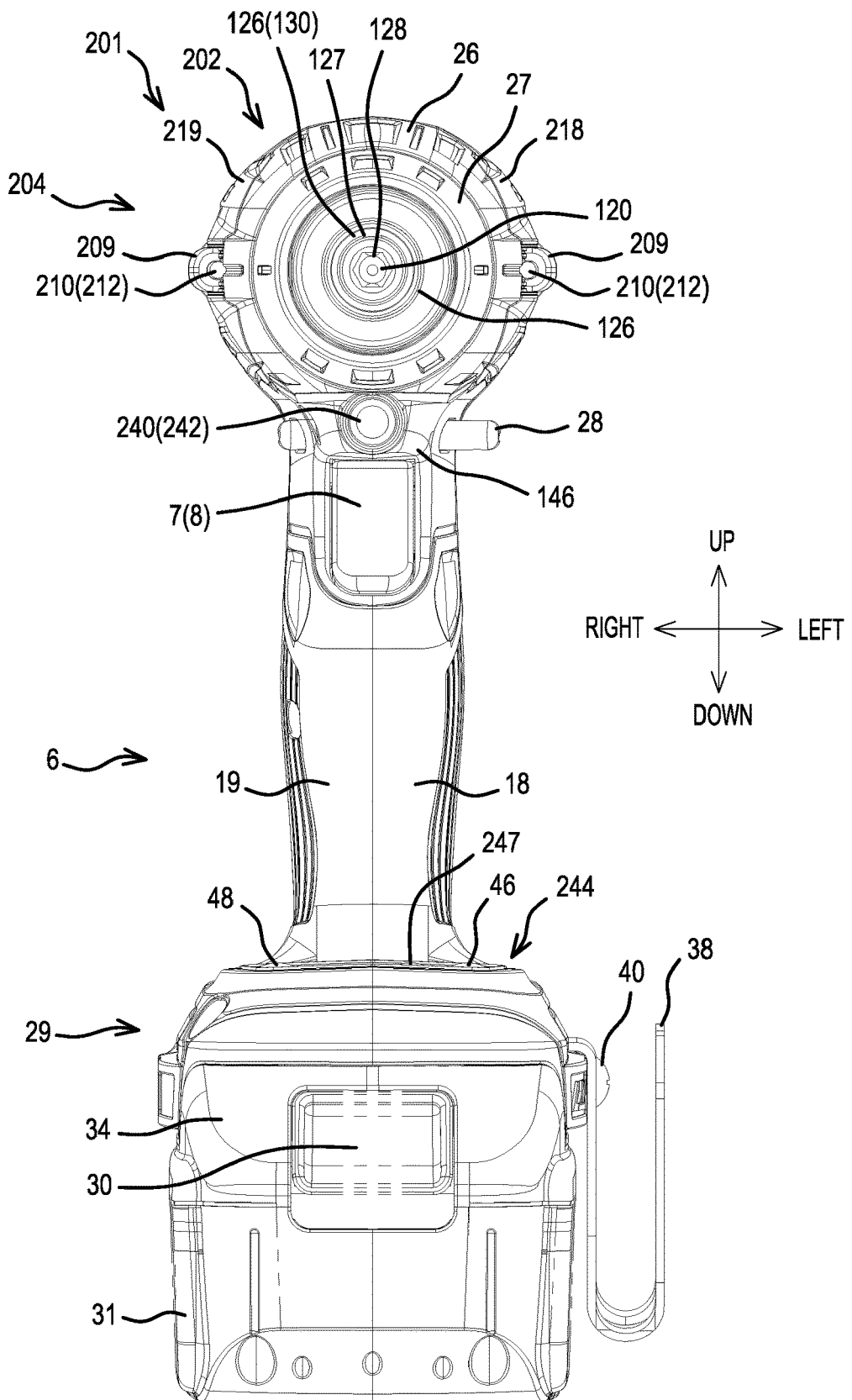
FIG. 11 is a drawing, corresponding to FIG. 2, of the impact driver according to the second embodiment.
Figure 12:
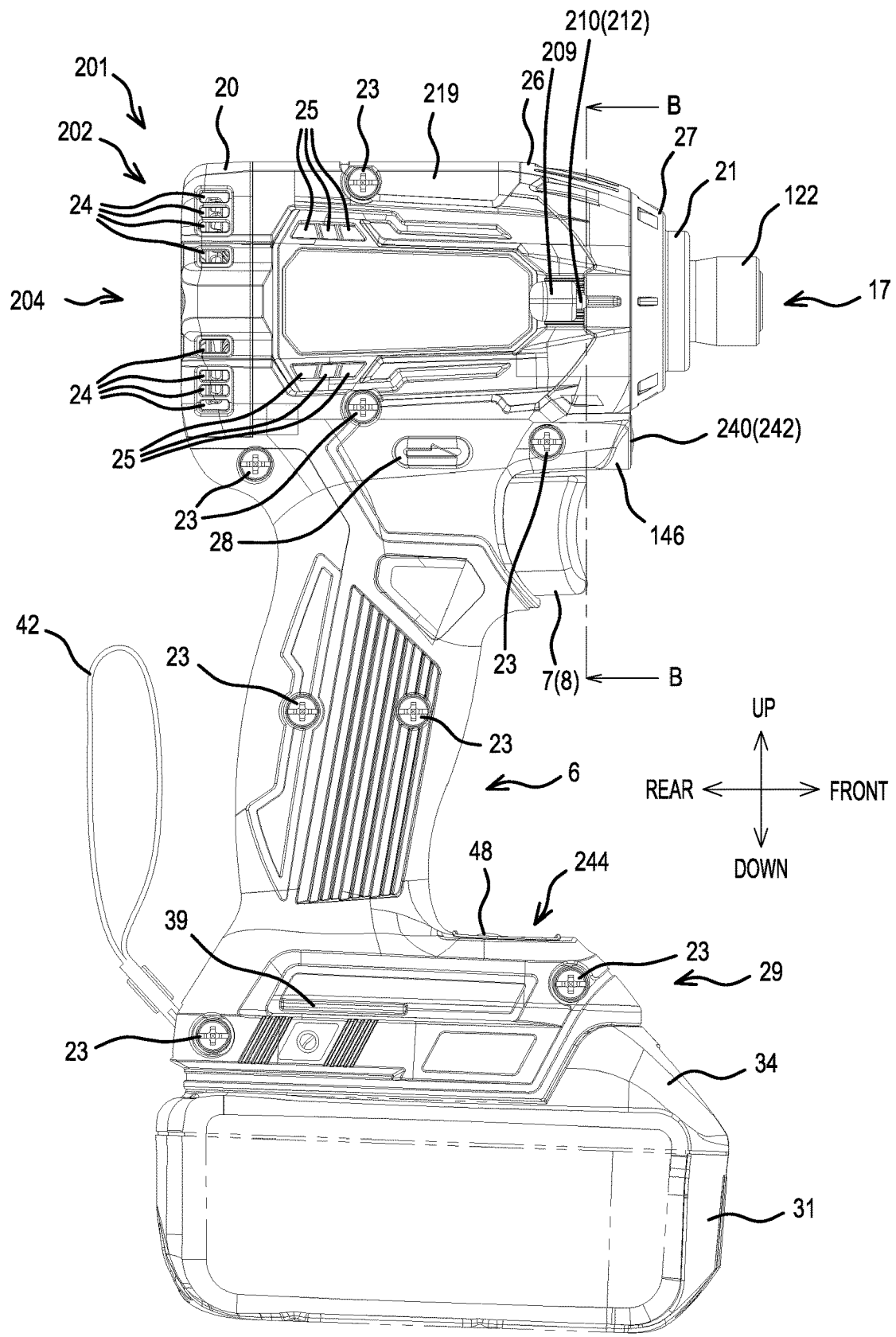
FIG. 12 is a drawing, corresponding to FIG. 3, of the impact driver according to the second embodiment.
Figure 13:
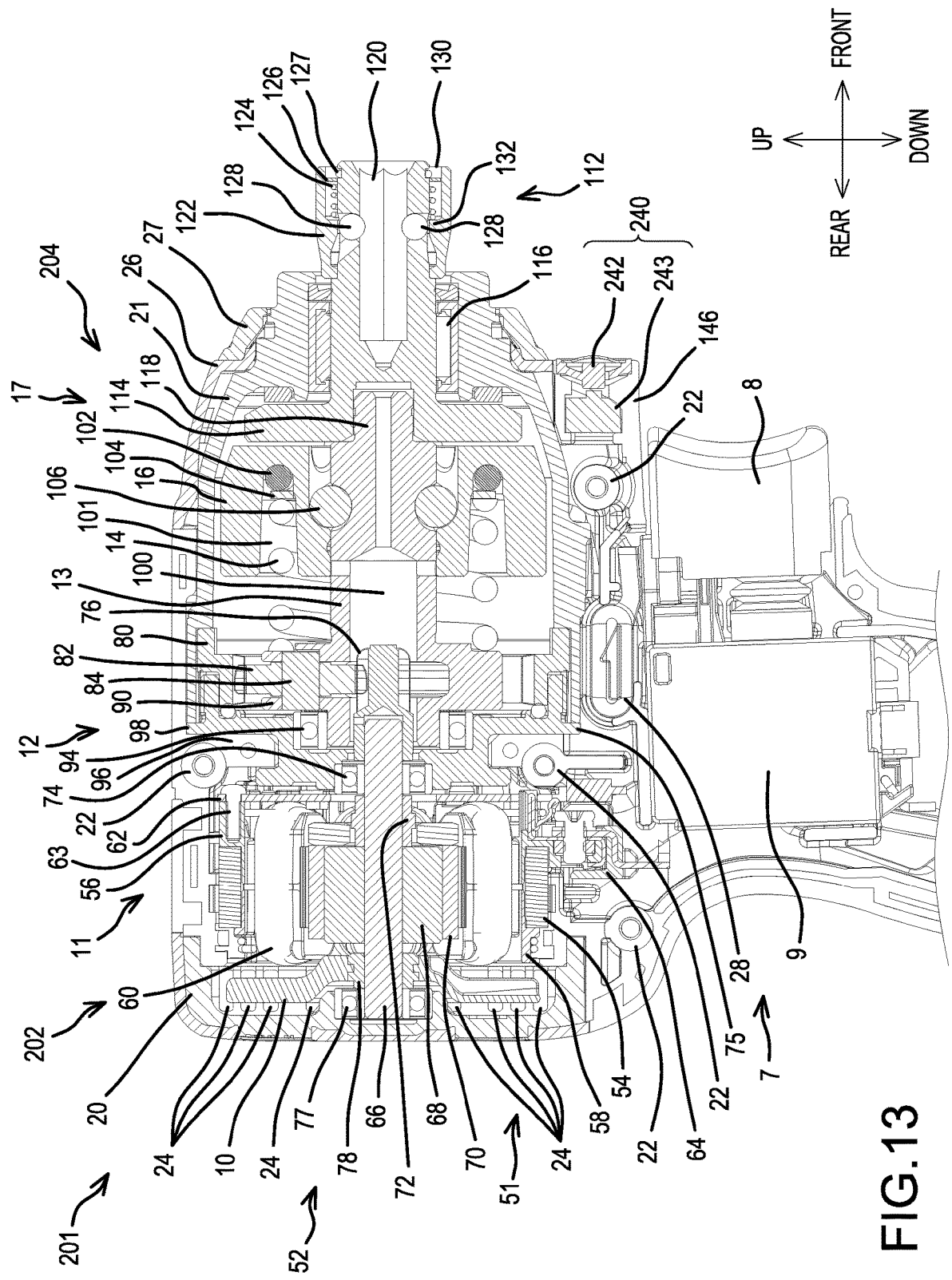
FIG. 13 is a drawing, corresponding to FIG. 5, of the impact driver according to the second embodiment.
Figure 14:
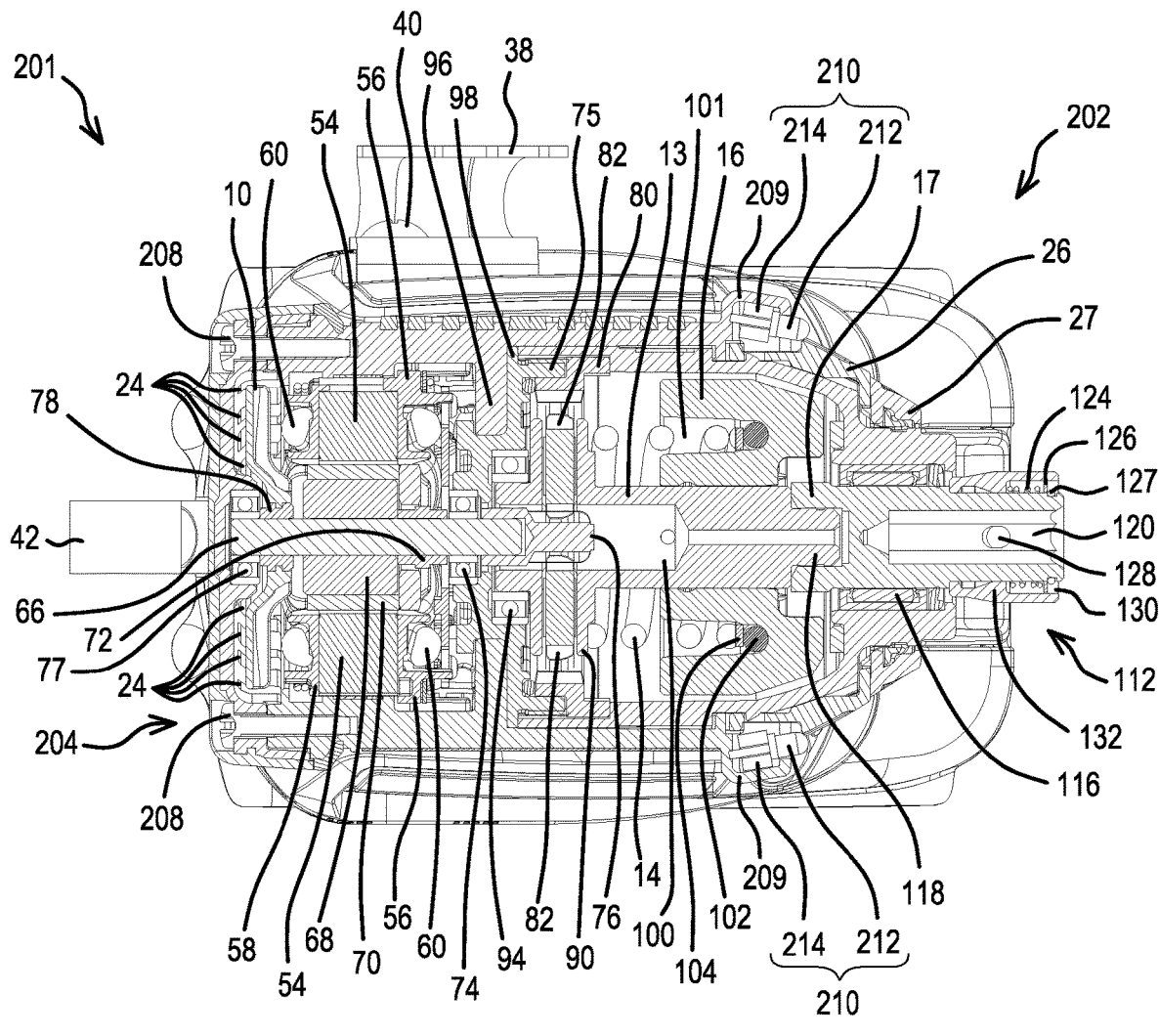
FIG. 14 is a center transverse-cross-sectional view of the main-body part in FIG. 10.
Figure 15:
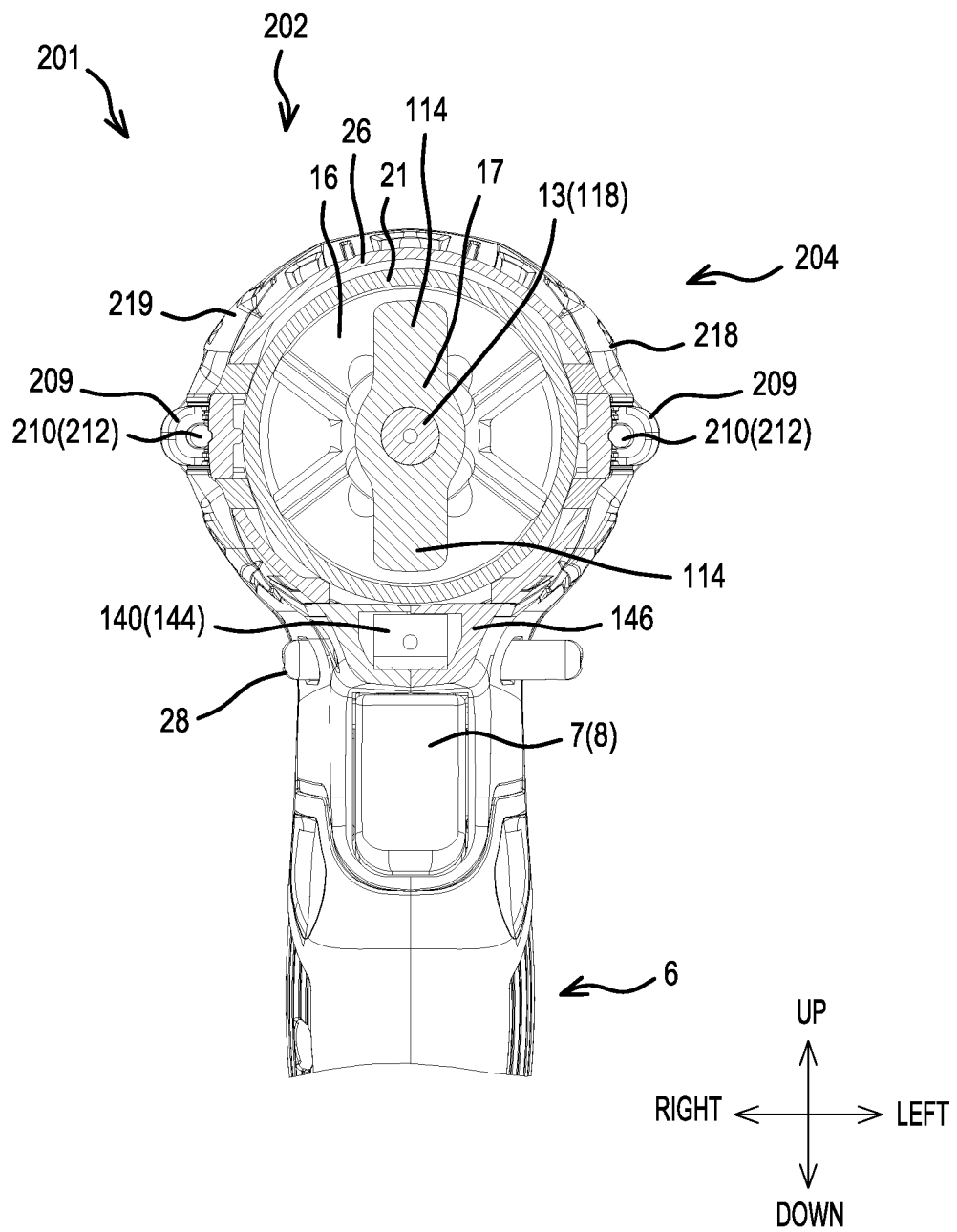
FIG. 15 is a cross-sectional view taken along line B-B in FIG. 12.

FIG. 10 is an oblique view, viewed from the front, of an impact driver 201 according to a second embodiment of the present teachings; FIG. 11 is a front view of the impact driver 201; FIG. 12 is a right view of the impact driver 201; FIG. 13 is an enlarged view of the upper part of the center longitudinal-cross-sectional view of the impact driver 201; FIG. 14 is a center transverse-cross-sectional view of a main-body part 204 of the impact driver 201; and FIG. 15 is a cross-sectional view taken along line B-B in FIG. 12.

The impact driver 201 is configured similarly to the impact driver 1 of the first embodiment, with the exception of the configuration of the front part of the main-body part. Hereinbelow, structural elements similar to those in the first embodiment are assigned the same symbols (reference numerals) as in the first embodiment, and explanations thereof are omitted where appropriate.

A state-changing operation part 240, which is configured similarly to the state-changing operation part 140 of the first embodiment, is disposed on the front-end part of the lower part of the main-body part 204 of the impact driver 201. The state-changing operation part 240 comprises a state-switching button 242, which serves as a state-switching switch, and a state-switch transmitting part 243.

It is noted that screws 208 for fixing the rear cover 20, which do not appear in the drawings related to the first embodiment, do appear in FIG. 14.

A pair of lights 210 is provided on a front-end part of a left housing 218 and a front-end part of a right housing 219 (the rear side of the cover 26) of the housing 202, which are the right and left sides of the front part of the main-body part 204 of the impact driver 201. Light-installation parts 209, which protrude outward in the left-right direction, constitute the installation parts of the lights 210 on the housing 202.

Each light 210 comprises an LED 212, which is a light-emitting member, and a light circuit board 214, on which the LED 212 is installed.

Each LED 212 comprises a light-emitting part and terminal parts, and the light-emitting part is visible frontward from the housing 202. The terminal parts of each LED 212 are electrically connected to the controller 33 via the corresponding light circuit board 214.

Figure 16A:
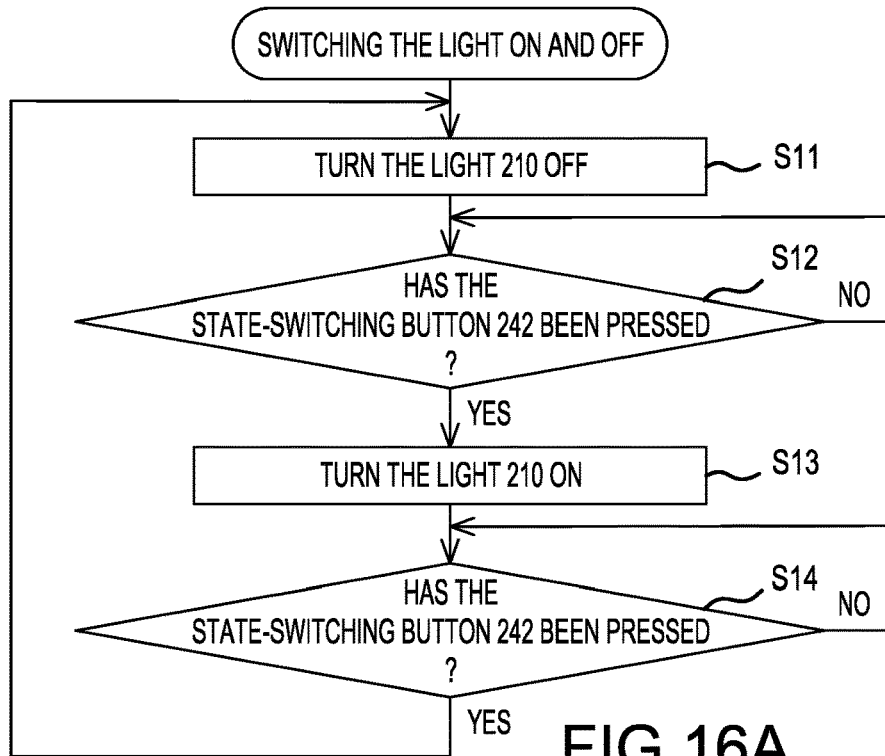
FIGS. 16(a) and (b) are flow charts, corresponding to FIG. 9, related to the control of a state-changing operation part performed by the controlling means shown in FIG. 8.
Figure 16B:
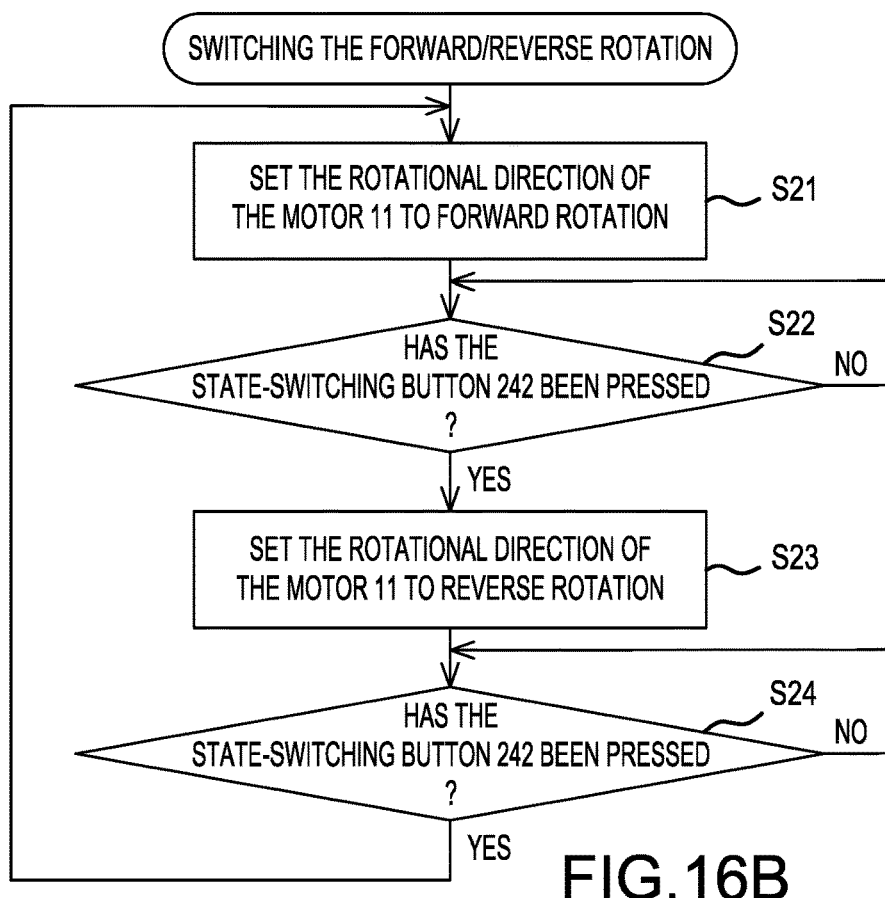

The lights 210 (the LEDs 212) are controlled by the controller 33 (the control part 150) as shown in, for example, FIG. 16.

That is, as shown in FIG. 16(a) (light switching), when the battery 31 is connected, the control part 150 sets the lamp ON/OFF state of the lights 210 to OFF, and thereby causes the LEDs 212 to not emit light (S11).

If the state-switching button 242 is then pressed and the state-switch transmitting part 243 is switched (YES in S12), the control part 150 sets the lamp ON/OFF state of the lights 210 to ON, electric power is supplied to the LEDs 212 via the light circuit boards 214, and the LEDs 212 are caused to emit light (S13).

Thereafter, the control part 150 awaits the pressing of the state-switching button 242 (S14) and, if pressed (YES), then the lamp ON/OFF state of the lights 210 once again becomes ON (return to S11).

Compared with the operation panel 44 of the first embodiment, it is noted that the operation panel 244 of the impact driver 201 is configured with the addition of a light-switching button 247. When there is another input to the light-switching button 247, the control part 150 switches the lamp ON/OFF state to a state other than the current state. A display part related to the lamp ON/OFF state of the lights 210 may be provided on the operation panel 244.

In addition, as shown in FIG. 16(*b*) (forward/reverse-rotation switching), if the pressing of the state-switching button 242 continues for a prescribed time (e.g., 2 s) or longer (a long press), then the control part 150 switches the switch-reception mode to a mode according to the switching of the state of the rotational direction of the motor 11. It is noted that, instead of or in addition to a long press of the state-switching button 242, the switching of the switch-reception mode may be a simultaneous pressing of the state-switching button 242 and the trigger 8, a double click of the state-switching button 242 (multiple inputs within a prescribed time, e.g., 1 s), or a combination thereof. The switching of the switch-reception mode may be performed by a dedicated switch.

The switch-reception mode differentiates which state is switched by the state-switching button 242, and includes: a light-switching mode, which switches the lamp ON/OFF state of the lights 210 as shown in FIG. 16(*a*); a forward/reverse-rotation switching mode, which switches the rotational direction of the motor 11 to a forward-rotation state (here, clockwise viewed from the front) or a reverse-rotation state (counterclockwise), as shown in FIG. 16(*b*); or an impact-force switching mode, which switches the impact force, as shown in FIG. 9.

In the control part 150 of the impact driver 201, when the battery 31 is connected (initially), the switch-reception mode is set to the light-switching mode; and with each subsequent long press of the state-switching button 242, the mode sequentially switches to the forward/reverse-rotation switching mode, the impact-force switching mode, and then returns to the light-switching mode. It is noted that the transitions of the switch-reception mode may be in an order other than that above, some of the switch-reception modes may be omitted, and other types of switch-reception modes may be added. Furthermore, a switch-reception-mode-display part that displays (a symbol corresponding to) the type of the current switch-reception mode may be provided on the operation panel 244 or the like.

In the forward/reverse-rotation switching mode, the control part 150 sets the rotational direction of the motor 11, which is the forward-rotation state in the initial state (S21), and, by the pressing of the state-switching button 242 (YES in S22), switches to the reverse-rotation state (S23).

Thereafter, the control part 150 awaits the pressing of the state-switching button 242 (S24) and, if pressed (YES), then the state of the rotational direction of the motor 11 becomes forward rotation (returns to S21).

The control part 150 switches the forward/reverse switching lever 28 in accordance with the current state of the rotational direction.

The impact driver 201 as described above comprises: the motor 11; the main-body part 204, in which the motor 11 is disposed; the handle part 6, which extends downward from the main-body part 204; the main switch 7, which is provided on (the upper part of) the handle part 6 and switches the motor 11 ON and OFF; the lights 210, which radiate light; and the state-changing operation part 240, which is (located on) the lower part of the main-body part 204, is provided upward of the main switch 7, and changes the lamp ON/OFF state of the lights 210. Thereby, the user can change the lamp ON/OFF state of the lights 210 by operating the state-changing operation part 240 while holding the impact driver 201 with one hand, and thus an impact driver 201 that excels in ease of operation is provided.

In addition, the state-changing operation part 240 is disposed forward of the main switch 7. Thereby, the state-switching button 242 can be operated with a forward finger while the handle part 6 is held with one hand, and thus operation is much easier.

In addition, the impact driver 201 comprises: the motor 11; the main-body part 204, in which the motor 11 is disposed; the handle part 6, which extends downward from the main-body part 204; the main switch 7, which is provided on the handle part 6 and switches the motor 11 ON and OFF; the lights 210, which radiate light; and the state-switching button 242, which is the front-end part of the main-body part 204, is provided upward of the main switch 7, and switches the lamp ON/OFF state of the lights 210. Thereby, the operation of turning the lights 210 ON and OFF is easy.

Furthermore, the state-switching button 242 of the impact driver 1 is provided on the lower part of the main-body part 4. Thereby, the state-switching button 242 is disposed at a location adjacent the handle part 6 and therefore the operation (manipulation) of the state-switching button 242 while holding the handle part 6 with one hand is much easier.

It is noted that the above-mentioned second embodiment includes, where appropriate, modified examples similar to those of the first embodiment.

For example, the state-changing operation part may be disposed on the front side of the upper-end part of the handle part, and the trigger may be provided on the lower side thereof.

In addition, the light circuit boards do not have to be provided, the number of the lights installed may be increased or decreased, and the lights may be installed at other locations.

The forward/reverse switching lever, the light-switching button, etc. may be omitted.

The state-changing operation part serves as a continuous-change operating means, such as a dial, and the brightness of the light may be changed without stages or continuously.

Third Embodiment

Figure 17:
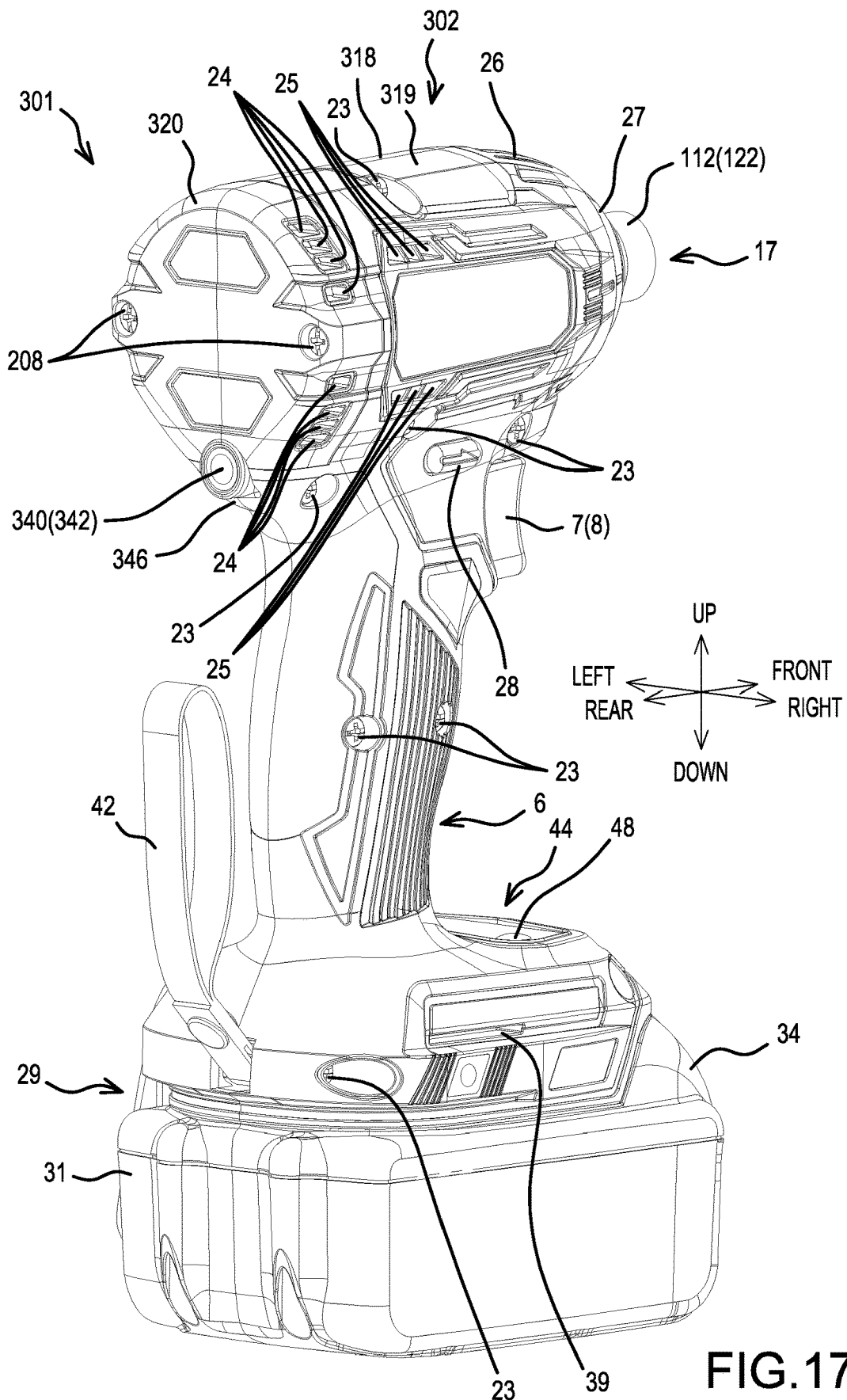
FIG. 17 is an oblique view, viewed from the rear, of an impact driver according to a third embodiment of the present teachings.
Figure 18:
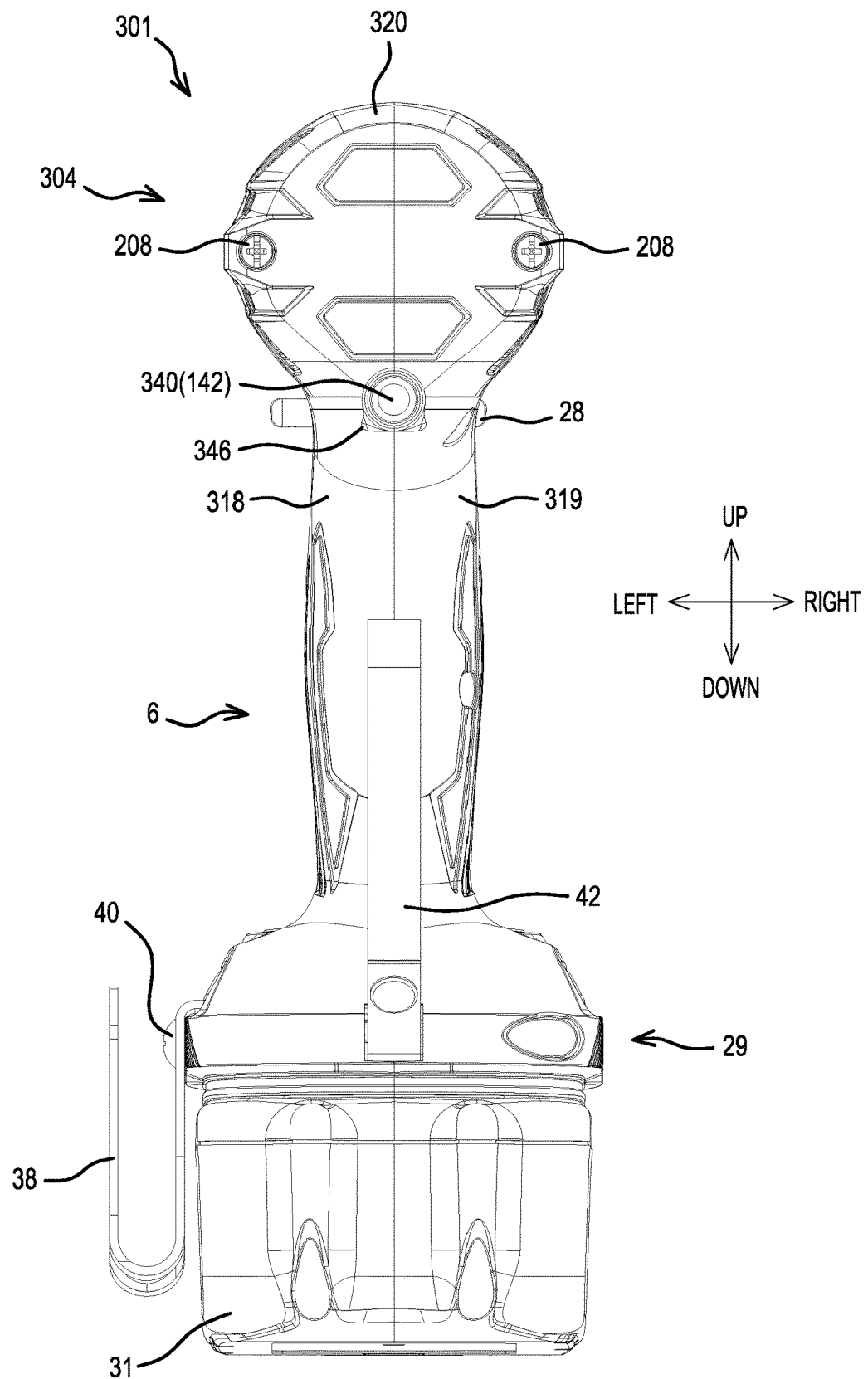
FIG. 18 is a rear view of the impact driver shown in FIG. 17.
Figure 19:
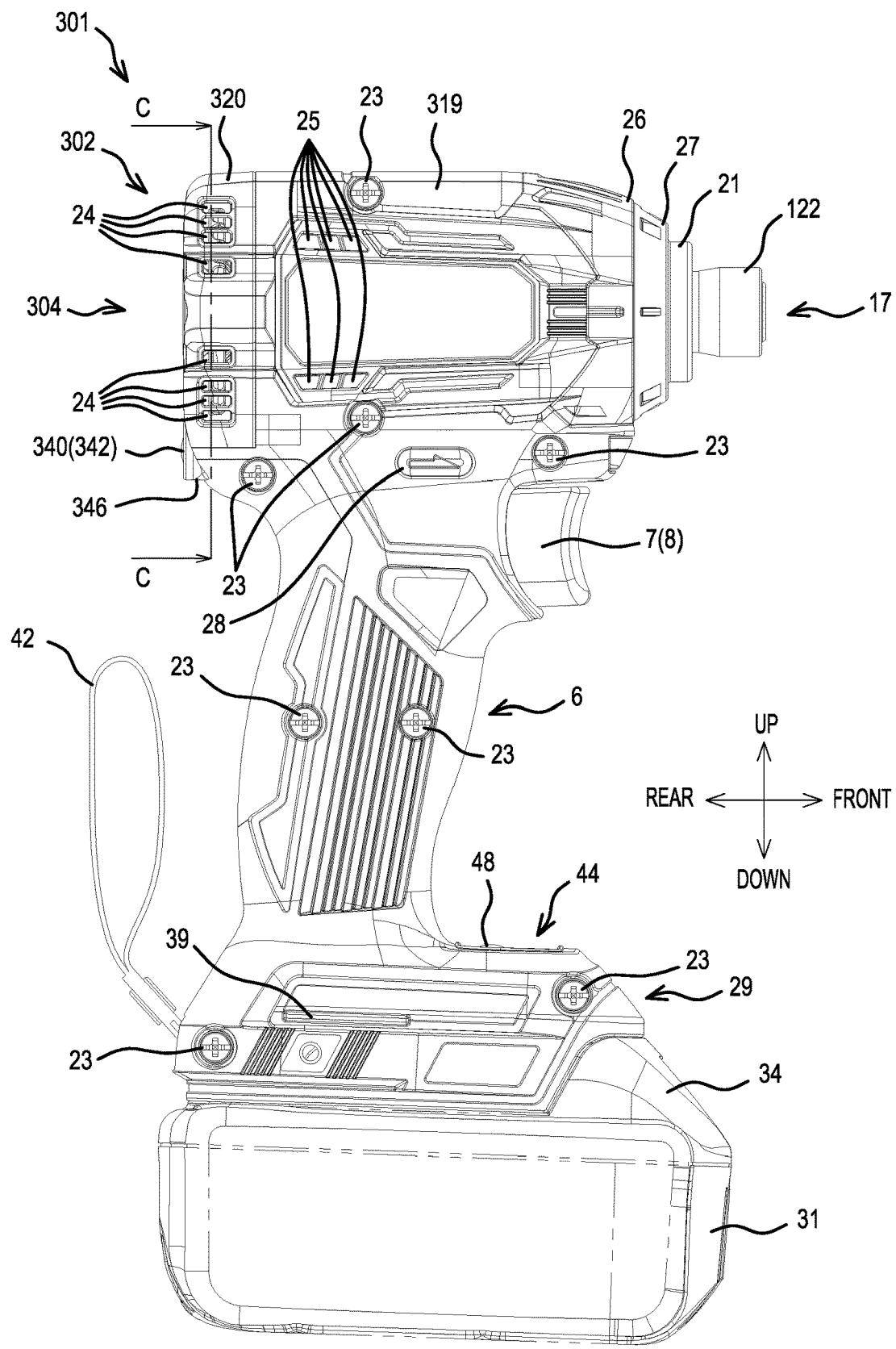
FIG. 19 is a drawing, corresponding to FIG. 5, of the impact driver according to the third embodiment.
Figure 20:
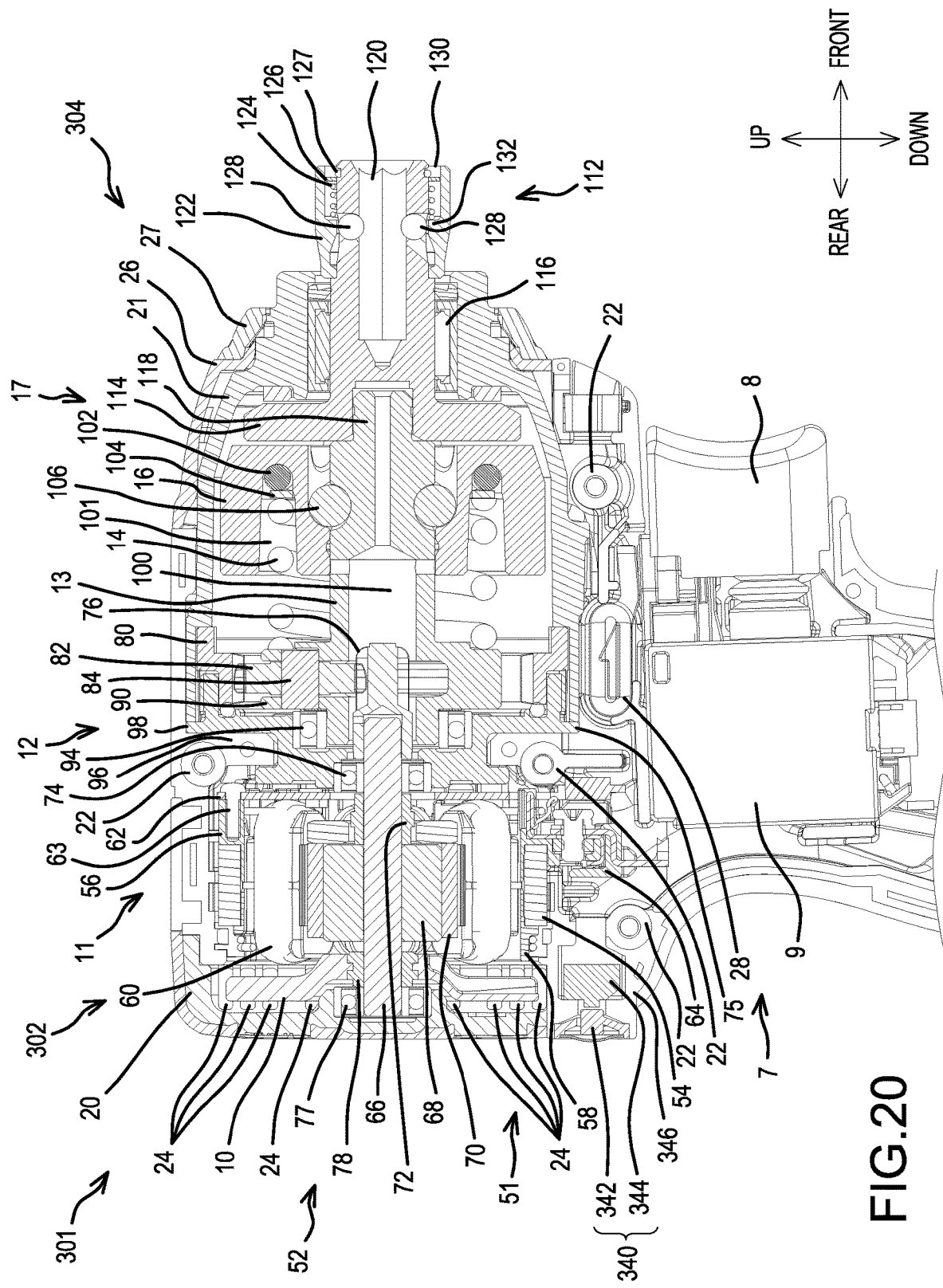
FIG. 20 is a drawing, corresponding to FIG. 5, of the impact driver according to the third embodiment.
Figure 21:
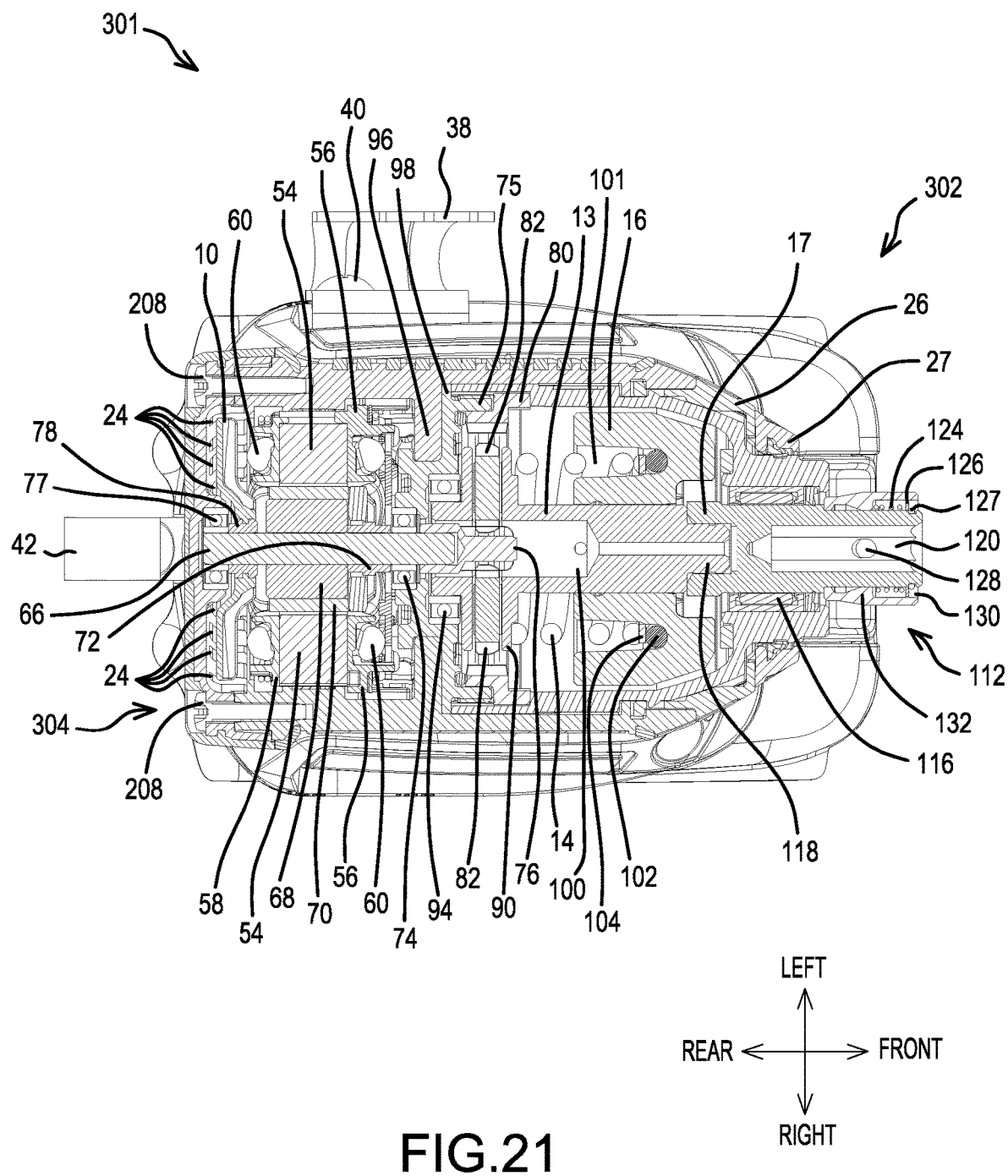
FIG. 21 is a drawing, corresponding to FIG. 14, of the impact driver according to the third embodiment.

FIG. 17 is an oblique view, viewed from the rear, of an impact driver 301 according to a third embodiment of the present teachings; FIG. 18 is a rear view of the impact driver 301; FIG. 19 is a right view of the impact driver 301; FIG. 20 is an enlarged view of the upper part of the center longitudinal-cross-sectional view of the impact driver 301; FIG. 21 is a center transverse-cross-sectional view of a main-body part 304 of the impact driver 301; and FIG. 22 is a cross-sectional view taken along line C-C in FIG. 19.

The impact driver 301 is configured similarly to the impact driver 1 of the first embodiment, with the exception of the configuration of the main-body part (the state-changing operation part). Hereinbelow, structural elements similar to those of the first embodiment are assigned the same symbols (reference numerals) as in first embodiment, and explanations thereof are omitted where appropriate.

A state-changing operation part 340 of the impact driver 301 is disposed on a rear-end lower part of the main-body part 304.

The state-changing operation part 340 is disposed inside a state-changing-operation-part installation part 346, which is formed downward of the fan 10. The state-changing-operation-part installation part 346 is formed on a lower-end part of a rear cover 320 of a housing 302 and between a left housing 318 and a right housing 319.

A state-switch transmitting part 344 of the state-changing operation part 340 is housed inside the housing 302, and a rear surface of a state-switching button 342, which serves as a state-switching switch, is visible from the rear surface of the housing 302.

If the control part 150 ascertains that an input has been made to the state-changing operation part 340, then the control part 150 sequentially switches the impact force.

The impact driver 301 described above comprises: the motor 11; the main-body part 304, in which the motor 11 is disposed; the handle part 6, which extends downward from the main-body part 304; the main switch 7, which is provided on the handle part 6 and switches the motor 11 ON and OFF; and the state-changing operation part 340, which is (located on) the rear-end part of the lower part of the main-body part 304, is provided upward of the main switch 7, and changes a rotational state (the impact force) of the motor 11. Thereby, the user, while holding the handle part 6 in the palm of one hand with all fingers except the thumb, can switch the state-changing operation part 340 with that thumb; or, the trigger 8 side can be set downward and the user, while supporting the handle part 6 with one hand except the thumb, can switch the state-changing operation part 340 with that thumb; further, in the impact driver 301, the impact force is switchable by an input being made to the state-changing operation part 340 with one hand alone, and therefore ease of operation is much more satisfactory.

In addition, the impact driver 301 comprises: the motor 11; the main-body part 304, in which the motor 11 is disposed; the handle part 6, which extends downward from the main-body part 304; the main switch 7, which is provided on the handle part 6 and switches the motor 11 ON and OFF; and the state-switching button 342, which is (located on) the rear-end part of the main-body part 304, is provided upward of the main switch 7, and switches a rotational state (the impact force) of the motor 11. Thereby, in the impact driver 301, the impact force is switchable by the operation of the state-switching button 342 on the front-end part with one hand alone, and therefore ease of operation is much more satisfactory.

Furthermore, the state-switching button 342 of the impact driver 301 is provided on the lower part of the main-body part 304. Thereby, the state-switching button 342 is disposed at a location adjacent the handle part 6, and the operation of the state-switching button 342 while the handle part 6 is being held with one hand alone is much easier.

It is noted that the above-mentioned third embodiment includes, where appropriate, modified examples similar to those of the first embodiment and the second embodiment.

For example, the state-changing operation part may be provided on the rear side of the upper-end part of the handle part.

In addition, the state-changing-operation-part installation part may be disposed inside the rear cover, inside the space from the left housing to the right housing, or the like.

In the third embodiment, the lights may be disposed as in the second embodiment, and other input-reception modes may be set and switched. The lights may be provided on the lower part of the front-end part of the main-body part (at the location of the state-changing-operation-part installation part according to the first embodiment).

A plurality of the state-changing operation parts may be provided where the state-changing operation part is located in the third embodiment, where the state-changing operation part is located in the first embodiment, etc.

Fourth Embodiment

Figure 23:
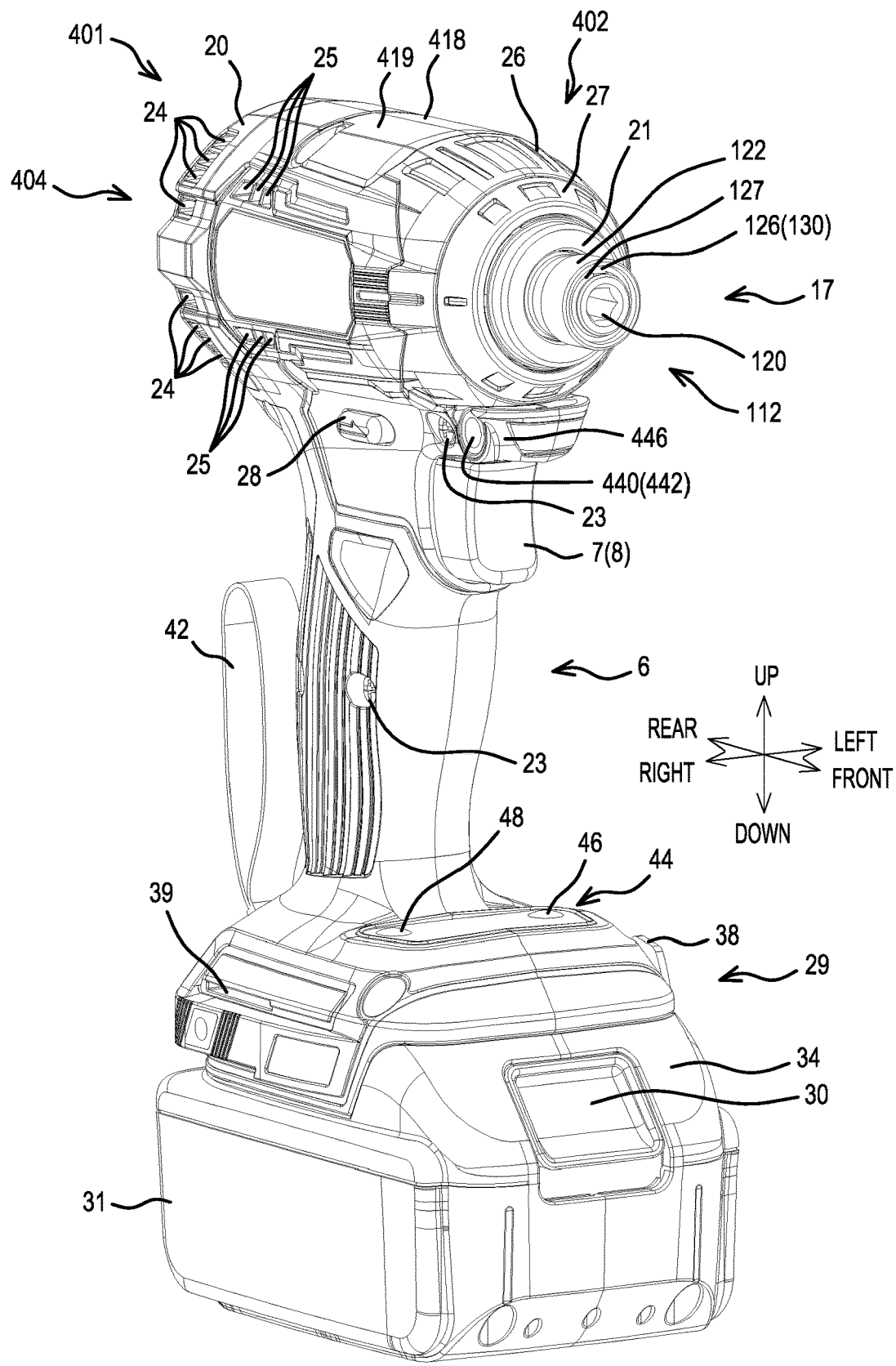
FIG. 23 is a drawing, corresponding to FIG. 1, of an impact driver according to a fourth embodiment.
Figure 24:
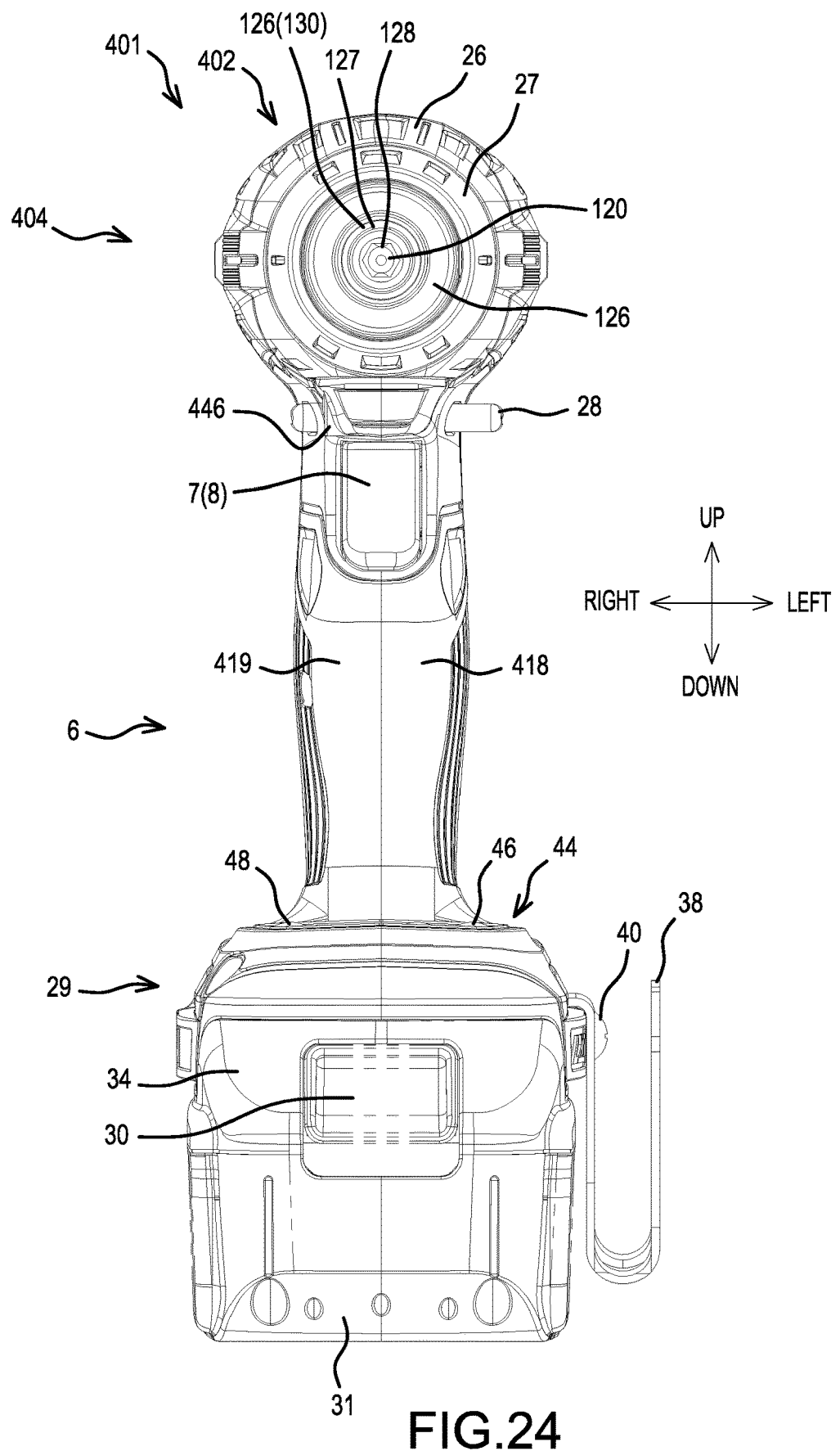
FIG. 24 is a drawing, corresponding to FIG. 2, of the impact driver according to the fourth embodiment.
Figure 25:
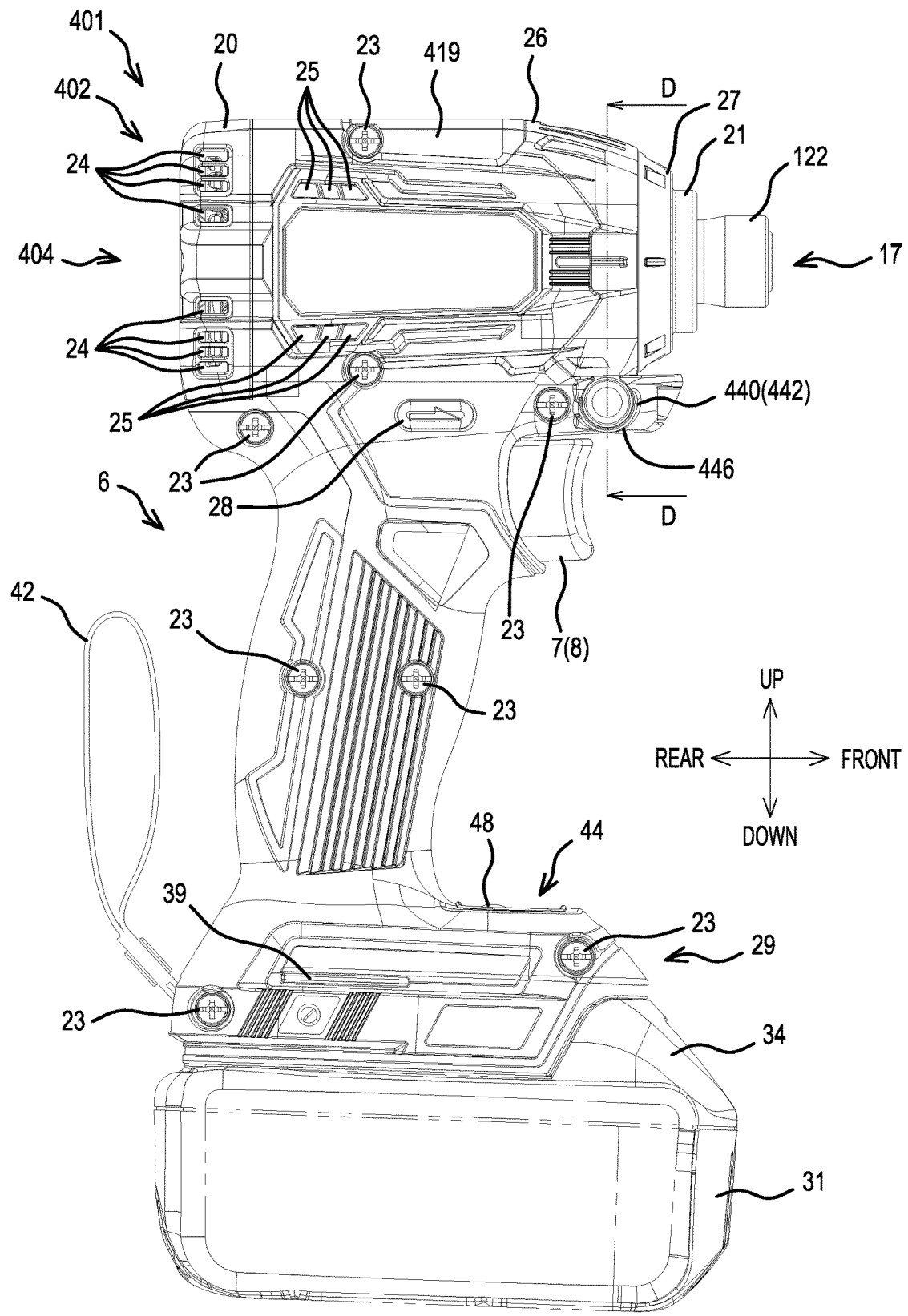
FIG. 25 is a drawing, corresponding to FIG. 3, of the impact driver according to the fourth embodiment.
Figure 26:
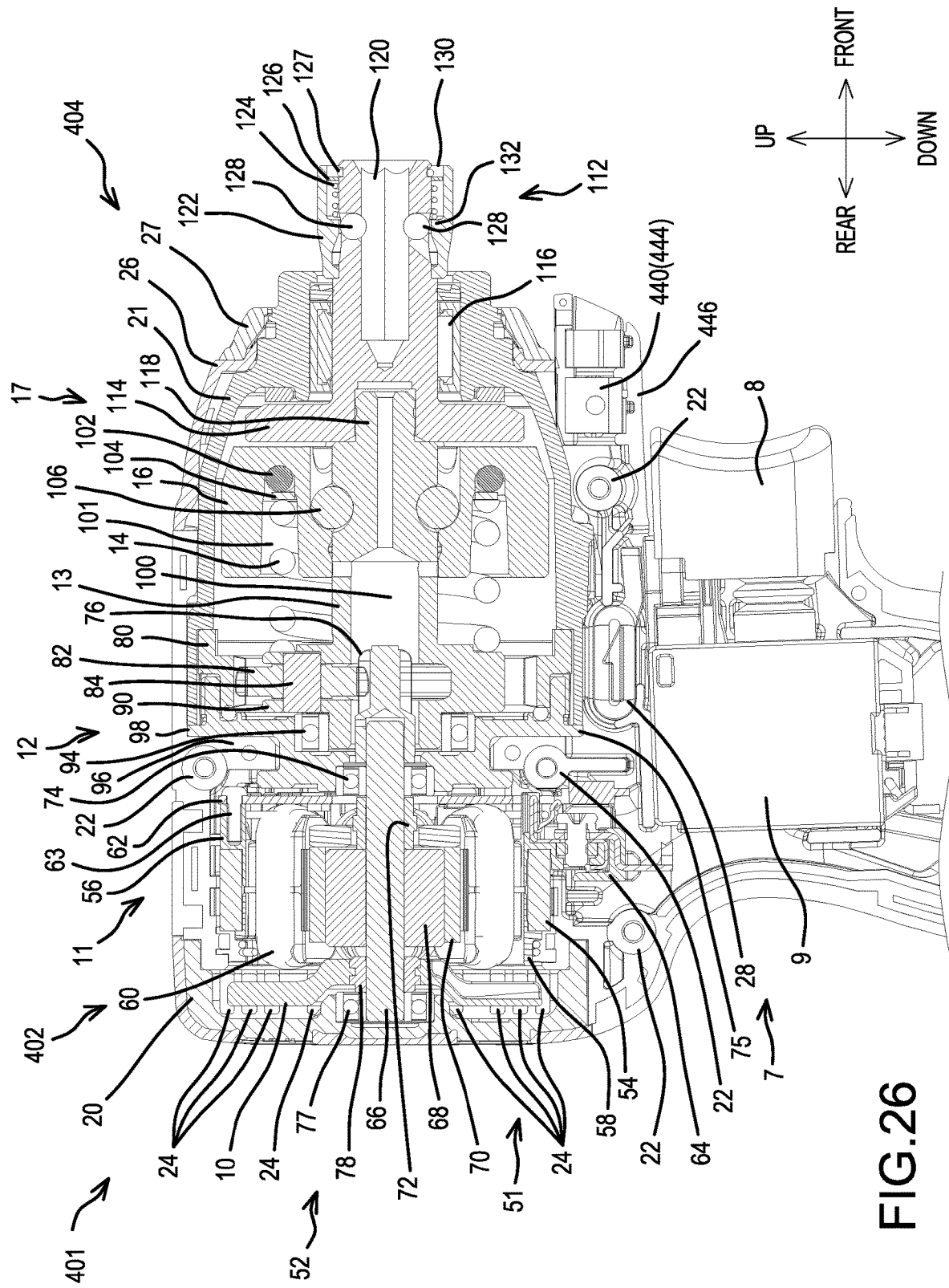
FIG. 26 is a drawing, corresponding to FIG. 5, of the impact driver according to the fourth embodiment.
Figure 27:
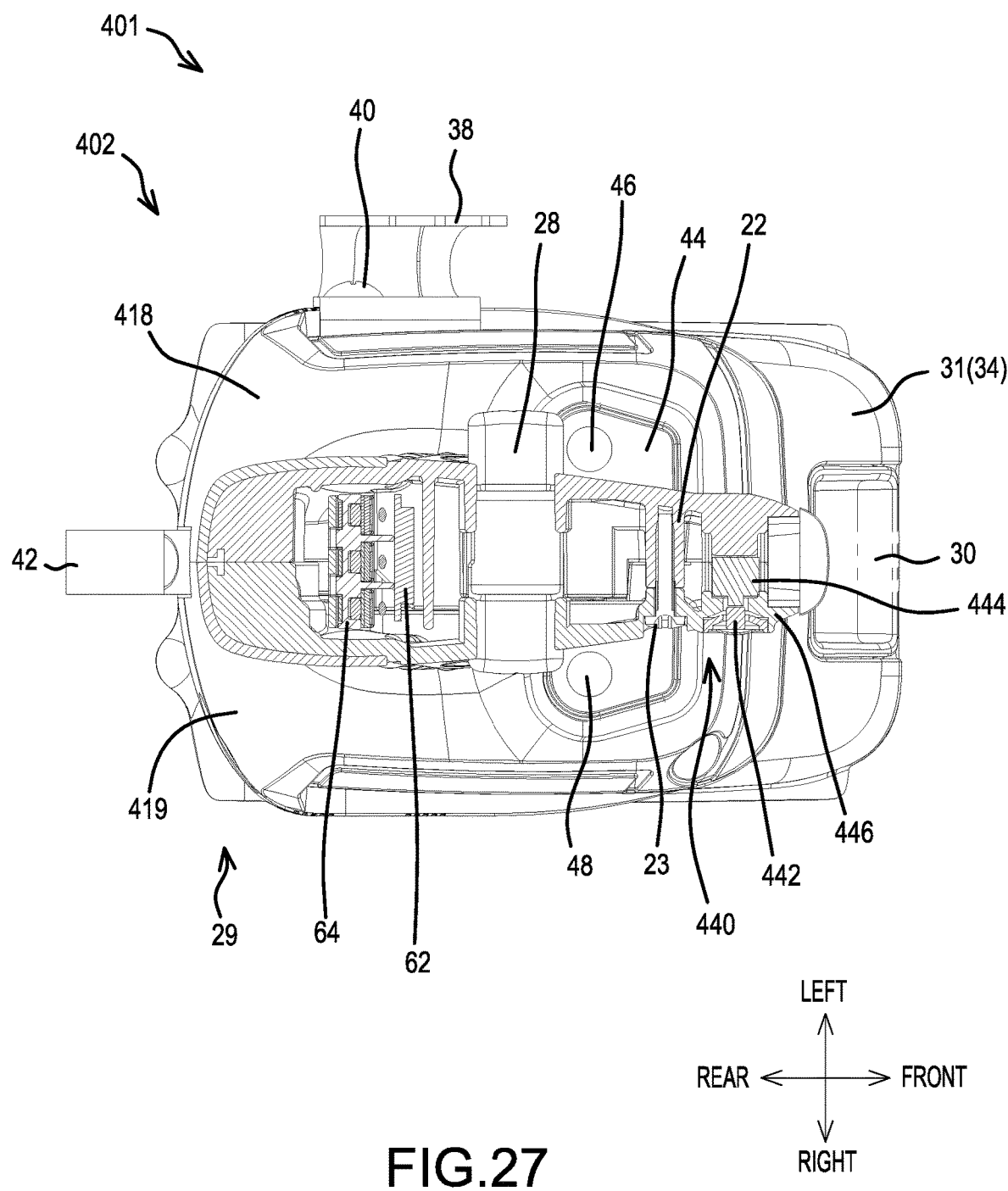
FIG. 27 is a drawing, corresponding to FIG. 6, of the impact driver according to the fourth embodiment.
Figure 28:
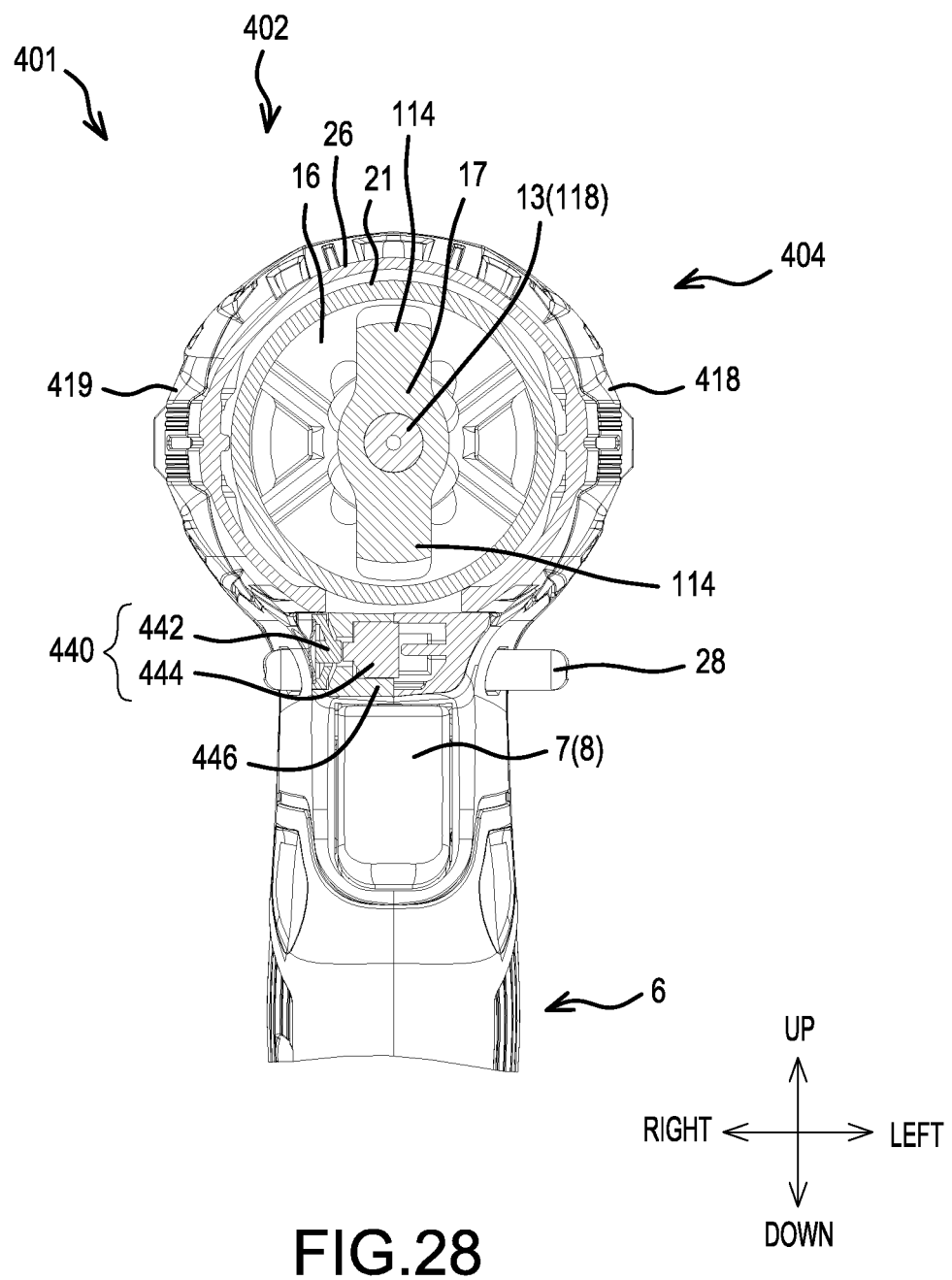
FIG. 28 is a cross-sectional view taken along line D-D in FIG. 25.

FIG. 23 is an oblique view, viewed from the front, of an impact driver 401 according to a fourth embodiment of the present teachings; FIG. 24 is a front view of the impact driver 401; FIG. 25 is a right view of the impact driver 401; FIG. 26 is an enlarged view of an upper part of the center longitudinal-cross-sectional view of the impact driver 401; FIG. 27 is a transverse-cross-sectional view of the section between a main-body part 404 and the trigger 8 of the impact driver 401; and FIG. 28 is a cross-sectional view taken along line D-D in FIG. 25.

The impact driver 401 is configured similarly to the first embodiment, with the exception of the configuration of the front-lower part (the state-changing operation part) of the main-body part. Hereinbelow, structural elements similar to those of the first embodiment are assigned the same symbols (reference numerals) as in the first embodiment, and explanations thereof are omitted where appropriate.

A state-changing operation part 440 of the impact driver 401 is disposed on a front-end lower part of the main-body part 404 such that a state-switching button 442, which serves as the state-switching switch, is visible on the right side.

The state-changing operation part 440 is installed in a housing 402 (a left housing 418 and a right housing 419) inside a state-changing-operation-part installation part 446, which is formed such that it is open on (to) the right side.

A state-switch transmitting part 444 of the state-changing operation part 440 is housed inside the housing 402, and the state-switching button 442 is visible from a right surface of the housing 402.

If the control part 150 ascertains that the state-changing operation part 440 has been switched, then the control part 150 sequentially switches the magnitude of the impact force.

The impact driver 401 described above comprises: the motor 11; the main-body part 404, in which the motor 11 is disposed; the handle part 6, which extends downward from the main-body part 404; the main switch 7, which is provided on the handle part 6 and switches the motor 11 ON and OFF; and the state-changing operation part 440, which is (located on) the rear-end part of the lower part of the main-body part 404, is provided upward of the main switch 7, and changes a rotational state (the impact force) of the motor 11. Thereby, the user, while holding the impact driver 401 with one hand in the state in which the chuck 112 is oriented toward the inner side, can operate the state-changing operation part 440 of the front-end lower part of the main-body part 404 with the other hand and can operate the state-changing operation part 440 to switch the impact force even if the other hand is not deeply inserted on the side of the impact driver 401; thus, ease of operation is much more satisfactory.

In addition, the impact driver 401 comprises: the motor 11; the main-body part 404, in which the motor 11 is disposed; the handle part 6, which extends downward from the main-body part 404; the main switch 7, which is provided on the upper part of the handle part 6 and switches the drive of the motor 11; and the state-switching button 442, which is (located on) the right side of the front-end part of the main-body part 404, is provided upward of the main switch 7, and switches a rotational state (the impact force) according to the motor 11. Thereby, in the impact driver 401, the impact force is switchable by operating (manipulating, pressing) the state-switching button 442 on the right side of the front-end part, and thus ease of operation is much more satisfactory.

Furthermore, the state-switching button 442 of the impact driver 401 is provided on the lower part of the main-body part 404. Thereby, the state-switching button 442 is disposed at a location adjacent the handle part 6, and the operation of the state-switching button 442 while the handle part 6 is being held is much easier.

It is noted that the above-mentioned fourth embodiment includes, where appropriate, modified examples similar to those of the first to third embodiments.

For example, in the fourth embodiment, the lights may be provided as in the second embodiment, and the changing of the switch-reception mode may be performed or the switching of the lamp ON/OFF state and the switching of the rotational-direction state may be performed.

Furthermore, the state-changing operation part may be provided on the left side of the main-body part or may be provided sideward of the upper-end part of the handle part.

In the fourth embodiment, the state-switching buttons of the first embodiment, the third embodiment, and the modified examples thereof may be provided in combination. A plurality of the state-switching buttons may be provided in the singular state-switch transmitting part.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block or component of a device, such as the controller 33 or control part 150 is also understood as a corresponding method step or as a feature of a method step. In an analogous manner, aspects which have been described in the context of or as a method step also represent a description of a corresponding block or detail or feature of a corresponding device, such as the controller 33 or control part 150.

Depending on certain implementation requirements, exemplary embodiments of the controller 33 or control part 150 of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the controller 33 or control part 150, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using the electric motor 11 and other mechanical structures of the power tool.

Therefore, although some aspects of the controller 33 or control part 150 have been identified as "parts" or "units" or "steps", it is understood that such parts or units or steps need not be physically separate or distinct electrical components, but rather may be different blocks of program code that are executed by the same hardware component, e.g., one or more microprocessors.

EXPLANATION OF THE REFERENCE NUMBERS 1, 201, 301, 401 Impact driver (power tool)
4, 204, 304, 404 Main-body part
6 Handle part
7 Main switch
140, 240, 340, 440 State-changing operation part
142, 242, 342, 442 State-switching button (state-switching switch)
210 Light

The invention claimed is:

1. A power tool comprising:
a main housing;
a motor disposed in the main housing;
a controller configured to control operation of the motor and including a switching device for varying the speed of the motor;
an anvil at least partially disposed in the main housing;
a hammer disposed within the main housing and being drivable by the motor to impact the anvil;
a handle extending obliquely from the main housing;
a trigger configured to energize the motor, the trigger being disposed on the handle between a first portion of the handle that connects to the main housing and a second portion of the handle that is remote from the first portion of the handle;
a first button located on the main housing adjacent to the handle or on the first portion of the handle, configured to depress a first switch electrically connected with the controller and being disposed in a plane that intersects the trigger and a rotational axis of the anvil so as to be operable by a finger of a user's hand while the user is gripping the handle, the first button being pressable to cycle through and manually select one impact force setting for impacting the anvil from among a plurality of stored impact force settings solely by a single push of the first button;
a second button located on the second portion of the handle, configured to depress a second switch electrically connected with the controller and being pressable to cycle through and manually select one impact force setting for impacting the anvil from among the plurality of stored impact force settings; and
a display part located on the second portion of the handle adjacent to the second button and configured to display the currently-selected impact force setting.

2. The power tool according to claim 1, wherein the trigger and the first switch are rearwardly depressible in parallel in a front-rear direction of the main housing.

3. The power tool according to claim 1, wherein the controller is configured to control the operation of the motor according to the currently-selected impact force setting.

4. The power tool according to claim 1, wherein the first button and the trigger are arranged such that both the first button and the trigger are alternately pressable with an index finger of a hand that is grasping the handle with fingers other than the index finger of the same hand.

5. The power tool according to claim 1, further comprising:
a forward/reverse switching lever supported on the main housing, the forward/reverse switching lever being pressable to switch the rotational direction of the motor;
a right housing half and a left housing half that are joined together to constitute the main housing and the handle; and
a screw that fixes the right housing half and the left housing half;
wherein the screw is disposed between the forward/reverse switching lever and the first button.

6. The power tool according to claim 1, further comprising a third button located on the second portion of the handle adjacent to the second button, the third button being pressable to select one automatic-speed-changing mode from a plurality of stored automatic-speed-changing modes that each automatically change the rotational speed of the motor during operation of the power tool, irrespective of the currently-selected impact force setting, in accordance with a program stored in the power tool.

7. The power tool according to claim 1, wherein:
the first switch is located at a lower part of a front-end portion of the motor housing and includes a transmitting part configured to transmit a signal when the second switch is pressed;
the anvil includes a pair of extension parts that extend perpendicular to a rotational axis of the spindle; and
the transmitting part and the extension parts are disposed in a common plane.

8. The power tool according to claim 1, further comprising an operational panel, the display part and the second button each being disposed on the operational panel.

9. The power tool according to claim 1, further comprising a third button disposed on the second portion of the handle and being pressable to generate a signal that is transmitted to the controller to select one automatic-speed-changing mode from a plurality of automatic-speed-changing modes that each automatically change the rotational speed of the motor during operation of the power tool, irrespective of the currently-selected impact force setting, or to cancel the selection of a previously selected automatic-speed-changing mode, the controller having a stored program that, when executed, automatically changes the rotational speed of the motor during operation of the power tool in accordance with the currently-selected automatic-speed-changing mode.

10. A power tool comprising:
a main housing;
a motor disposed in the main housing;
an anvil at least partially disposed in the main housing;
a hammer disposed within the main housing and being drivable by the motor to impact the anvil;
a controller configured to control operation of the motor;
a handle extending obliquely from the main housing;
a trigger configured to energize the motor, the trigger being disposed on the handle between a first portion of the handle that connects to the main housing and a second portion of the handle that is remote from the first portion of the handle;
an impact-force pushbutton switch located in the second portion of the handle, electrically connected with the controller and configured to manually select one impact force setting for impacting the anvil from among a plurality of stored impact force settings with each pressing of the impact-force pushbutton switch;
an automatic-speed-changing mode pushbutton switch located in the second portion of the handle and configured to output a signal to the controller that selects one automatic-speed-changing mode from a plurality of automatic-speed-changing modes or cancels the selection of a previously selected automatic-speed-changing mode;
a state-setting pushbutton switch located on the main housing adjacent to the handle or on the first portion of the handle and being disposed in a plane that intersects the trigger and a rotational axis of the anvil so as to be operable by a finger of a user's hand while the user is gripping the handle, the state-setting pushbutton switch being pressable to cycle through the plurality of stored impact force settings solely by a single push of the state-setting pushbutton switch; and at least one display part located on the second portion of the handle adjacent to the first button and configured to display the currently-selected impact force setting and the currently-selected automatic-speed-changing mode;

wherein the controller stores a program that, when executed, displays on the at least one display part the currently-selected impact force setting selected by the impact-force pushbutton switch or the state-setting pushbutton switch and controls a rotational speed of the motor in accordance with the currently-selected impact force setting; and displays on the at least one display part the currently-selected automatic-speed-changing mode and automatically changes the rotational speed of the motor during operation of the power tool in accordance with the currently-selected automatic-speed-changing mode, irrespective of the currently-selected impact force setting.

11. The power tool according to claim 10, wherein the state-setting pushbutton switch and the trigger are arranged such that both the state-setting pushbutton switch and the trigger are alternately pressable with an index finger of a hand that is grasping the handle with fingers other than the index finger of the same hand.

12. The power tool according to claim 11, further comprising:
a forward/reverse switching lever supported on the main housing, the forward/reverse switching lever being pressable to switch the rotational direction of the motor;
a right housing half and a left housing half that are joined together to constitute the main housing and the handle; and
a screw that fixes the right housing half and the left housing half;
wherein the screw is disposed between the forward/reverse switching lever and the state-setting pushbutton button.

13. The power tool according to claim 12, wherein:
the state-setting pushbutton switch is located at a lower part of a front-end portion of the main housing and includes a transmitting part configured to transmit a signal when the state-setting pushbutton switch is pressed;
the anvil includes a pair of extension parts that extend perpendicular to a rotational axis of the spindle; and
the transmitting part and the extension parts are disposed in a common plane.

14. The power tool according to claim 10, further comprising:
a forward/reverse switching lever supported on the main housing, the forward/reverse switching lever being pressable to switch the rotational direction of the motor;
a right housing half and a left housing half that are joined together to constitute the main housing and the handle; and
a screw that fixes the right housing half and the left housing half;
wherein the screw is disposed between the forward/reverse switching lever and the state-setting pushbutton button.

15. The power tool according to claim 10, wherein:
the state-setting pushbutton switch is located at a lower part of a front-end portion of the main housing and includes a transmitting part configured to transmit a signal when the state-setting pushbutton switch is pressed;
the anvil includes a pair of extension parts that extend perpendicular to a rotational axis of the spindle; and
the transmitting part and the extension parts are disposed in a common plane.

16. A power tool comprising:
a brushless motor having a stator having at least one coil and a rotor that is rotatable with respect to the stator, extends in a front-rear direction and includes at least one permanent magnet;
a planetary gear mechanism configured to be rotated by the rotor;
a spindle configured to be rotated by the planetary gear mechanism and extending in the front-rear direction;
a hammer held on the spindle:
an anvil configured to receive a rotational impact force from the hammer;
a hammer case that accommodates the hammer and at least a portion of the anvil;
a motor housing that accommodates the brushless motor, is elongated in the front-rear direction and is disposed rearward of the hammer case in the front-rear direction;
a handle portion extending from the motor housing obliquely with respect to the front-rear direction;
a switch main-body part provided in an upper portion of the handle portion;
a trigger provided forward of the switch main-body part in the front-rear direction and being depressible rearward in the front-rear direction to change a switch state of the switch main-body part;
a state-switch transmitting part provided between the trigger and the hammer case in an up-down direction that is perpendicular to the front-rear direction;
a state-switching button provided forward of the state-switch transmitting part in the front-rear direction and being depressible rearward in the front-rear direction to change a switch state of the state-switch transmitting part; and
a controller electrically connected to the switch main-body part and to the state-switch transmitting part, the controller being configured to change a currently-selected rotational impact force that is applied by the hammer to the anvil in response to each change of the switch state of the state-switching button.

17. The power tool according to claim 16, further comprising first and second lights respectively disposed on left and right sides of the motor housing in a left-right direction that is perpendicular to the front-rear direction and to the up-down direction.

18. The power tool according to claim 16, further comprising:
a ring-shaped bumper disposed on an outer peripheral side of the anvil,
wherein a front end of the bumper in the front-rear direction is located forward of a front end of the state-switching button in the front-rear direction.

19. The power tool according to claim 16, further comprising:
- at least one display part located on a lower portion of the handle below the trigger in the up-down direction,
- wherein the at least one display part is electrically connected to the controller and is configured to display the currently-selected rotational impact force.

20. The power tool according to claim 19, further comprising:
- first and second lights respectively disposed on left and right sides of the motor housing in a left-right direction that is perpendicular to the front-rear direction and to the up-down direction;
- a ring-shaped bumper disposed on an outer peripheral side of the anvil forward of the first and second lights in the front-rear direction; and
- an operation panel that includes:
  - an impact-force switching button electrically connected to the controller and configured to switch the currently-selected rotational impact force; and
  - an automatic-speed-changing-mode switching button configured to select an automatic speed-changing mode that is executed by the controller to control a rotational speed of the rotor during operation;

wherein:
- the operation panel is located on the lower portion of the handle portion below the trigger in the up-down direction and includes the at least one display part;
- a front end of the bumper in the front-rear direction is located forward of a front end of the state-switching button in the front-rear direction; and
- the rotor, the state-switching button, and the trigger are intersected by a common plane extending in the up-down direction.

* * * * *